US012564148B1

(12) United States Patent
Koniski et al.

(10) Patent No.: US 12,564,148 B1
(45) Date of Patent: Mar. 3, 2026

(54) CONTAINER TRANSFER SYSTEM AND METHODS OF USING

(71) Applicant: AeroFarms, Inc., Newark, NJ (US)

(72) Inventors: John Koniski, New York, NY (US);
Richard Canny, Roseville, MI (US);
Husein Delic, Roseville, MI (US)

(73) Assignee: New AeroFarms, Inc., Ringgold, VA (US)

( * ) Notice: Subject to any disclaimer, the term of this patent is extended or adjusted under 35 U.S.C. 154(b) by 504 days.

(21) Appl. No.: 18/136,045

(22) Filed: Apr. 18, 2023

Related U.S. Application Data

(60) Provisional application No. 63/331,932, filed on Apr. 18, 2022.

(51) Int. Cl.
A01G 31/04 (2006.01)
A01G 31/06 (2006.01)

(52) U.S. Cl.
CPC ............. A01G 31/04 (2013.01); A01G 31/06 (2013.01)

(58) Field of Classification Search
CPC ................................................... B65G 1/0435
See application file for complete search history.

(56) References Cited

U.S. PATENT DOCUMENTS

| | | | | |
|---|---|---|---|---|
| 3,677,423 | A * | 7/1972 | Tollefsrud | B65G 47/642 |
| | | | | 198/300 |
| 4,662,810 | A * | 5/1987 | Nobuhara | B65G 1/0435 |
| | | | | 74/417 |
| 5,161,929 | A | 11/1992 | Lichti, Sr. | |
| 5,199,840 | A * | 4/1993 | Castaldi | B65G 1/0435 |
| | | | | 414/280 |
| 5,328,316 | A * | 7/1994 | Hoffmann | B65G 1/0435 |
| | | | | 414/280 |
| 7,991,505 | B2 | 8/2011 | Lert, Jr. et al. | |
| 8,731,740 | B2 | 5/2014 | Ogawa | |
| 9,555,967 | B2 | 1/2017 | Stevens | |
| 9,738,462 | B2 | 8/2017 | Cavelius | |
| 9,857,389 | B2 | 1/2018 | Endo et al. | |

(Continued)

FOREIGN PATENT DOCUMENTS

| | | |
|---|---|---|
| CN | 102246048 B | 5/2014 |
| CN | 109068598 A | 12/2018 |

(Continued)

OTHER PUBLICATIONS

Bakery Automatic Rack Loading—Es—AUXPAMA, https://www.youtube.com/watch?v=idO_a_DeGqA, May 14, 2015.

*Primary Examiner* — Jonathan Snelting
(74) *Attorney, Agent, or Firm* — McCarter & English, LLP

(57) ABSTRACT

A container transfer system is provided that positions containers in a rack that can include one or more movable and separated gates. The gates can control the movement of the container into and away from the rack. The container transfer system can have a container transfer carriage with one or more manipulator arms and a latch actuation mechanism that extends or retracts the one or more gates positioned in the rack. The container transfer system provides control of the container position during the loading and unloading process from the rack. The container transfer system can accurately position containers within racking systems as well as aeroponic and/or hydroponic grow systems and towers.

36 Claims, 19 Drawing Sheets

(56)     References Cited

U.S. PATENT DOCUMENTS

| | | | |
|---|---|---|---|
| 10,000,336 B2 | 6/2018 | Poulin | |
| 10,196,207 B2 * | 2/2019 | Keating | B65G 1/0492 |
| 10,934,091 B1 * | 3/2021 | Kalm | B65G 1/1376 |
| 2015/0274425 A1 | 10/2015 | Wend | |

FOREIGN PATENT DOCUMENTS

| | | |
|---|---|---|
| CN | 215478482 U | 1/2022 |
| DE | 102020111980 A1 | 11/2021 |
| SU | 1564065 A1 | 5/1990 |
| WO | 2021080336 A1 | 4/2021 |
| WO | 2022084516 A1 | 4/2022 |

* cited by examiner

CONTAINER TRANSFER SYSTEM AND METHODS OF USING

CROSS-REFERENCE TO RELATED APPLICATIONS

This application claims the benefit of a commonly assigned U.S. Provisional Patent Application No. 63/331,932, which was filed on Apr. 18, 2022. The entire content of the foregoing provisional application is incorporated herein by reference.

BACKGROUND

Vertical aeroponic and/or hydroponic grow systems can include rack and tower structures for support of growing containers and lighting for developing plants. These systems can have multiple levels, have numerous containers on each level, and can have the racks or tower structures closely spaced in rows within a growing facility. The grow tower can include a frame composed of a plurality of framing members. Rails for positioning and movement of growing trays or containers within the tower can be supported by the frame. Support fixtures mounted within the frame can be used to position growing lights above the plants. Securely positioning large containers within a rack or tower provides reliable operation of the aeroponic and/or hydroponic systems and can eliminate system downtime to free containers that become jammed or misaligned as they are translated within the rack. Control of the alignment and/or position of the container to be loaded/unloaded relative to other containers is important to provide proper and safe loading and unloading of the containers. There is a continuing need for container rack and tower systems for regulating the loading and unloading process of containers, that support translatable containers, and that facilitate secure transfer containers into and away from the rack or tower.

SUMMARY

Embodiments of the present disclosure provide a container transfer system that can position container in a rack. The rack can include one or more movable gates. The container transfer system can have a container transfer carriage that includes one or more manipulator arms and a latch actuation mechanism that opens the one or more gates positioned on the rack. The container transfer system provides control of the container position during the loading and unloading processes from the rack. The container transfer system can accurately position containers including aeroponic and/or hydroponic growing containers within the rack.

Embodiments of the disclosure can include a method of container transfer system operation that can include the acts or steps of transferring a container between a supporting surface of a container transfer carriage and a support surface of a container rack latch system. The container rack latch system can be positioned within a rack. The container transfer carriage can include one or more manipulators for transferring and moving containers. The method can include the acts or steps of operating the one or more manipulators of the container transfer carriage and the container rack latch system to load the container from the container transfer carriage onto the support surface of the rack latch system.

Embodiments of the disclosure can include a container transfer carriage that can have a supporting surface capable of receiving and transferring a container along the supporting surface of the container transfer carriage and can include actuatable stops near the proximal end and near the distal end of the supporting surface of the container transfer carriage. The actuatable stops can extend or otherwise protrude above the supporting surface, for example from a transfer carriage roller or from the sides of the transfer carriage or between rollers. The actuatable stops can permit transfer of the container onto the carriage supporting surface between the stops without stop actuation, for example the container can push the stops open as the container is moved onto the container supporting surface and between the stops. The stops can permit transfer of a container initially positioned between locked stops beyond the supporting surface when one or more of the stops are actuated, unlocked, or retracted.

Embodiments of the disclosure can include a method of container transfer carriage operation. The method can include the acts or steps of engaging the container(s) with a manipulator of the container transfer carriage and transferring the container toward or away from a distal end of a supporting surface of the container transfer carriage. The method can further include operating a latch actuator mechanism of the container transfer carriage that is adapted to retract a gate on a tower or rack and operating the one or more manipulators of the container transfer carriage to transfer the container toward or away from the distal end of the supporting surface of the container transfer carriage. The container can be translated from the container transfer carriage into the rack. The method of container transfer carriage operation can further include orienting the supporting surface of the container transfer carriage parallel to a container supporting surfaces or another external carriage to which the container(s) are transferred and/or received.

Embodiments of the disclosure can include a container rack latch system. The container rack latch system can include one or more gates at a proximal end of the rack and an opposing one or more gates spaced from the proximal end of the rack. The gates can be rotatable. In some embodiments of the disclosure including rotatable gates, the rotatable gates can be linked by a rotatable shaft. The gates can rotate simultaneously as a pair. The one or more rotatable gates at the proximal end of the rack can be selectively positioned in an extended orientation protruding above a plane defined by the container supporting surfaces of the container rack latch system. The one or more rotatable gates can be selectively positioned in a retracted orientation whereby the gates extend below a plane defined by the supporting surfaces of the container rack latch system. In the extended position, the gates can prevent transfer of containers along the container supporting surface. The one or more gates can be selectively position in a retracted position that permits containers to be moved away from or along the container supporting surfaces. In the extended orientation, one or more of the rotatable gates can prevent transfer of a growing container from the container transfer carriage to the supporting surface. In the retracted orientation, the one or more rotatable gates allows transfer of the growing container into and from the carriage to the container rack latch supporting surfaces within the rack. The growing container can includes one or more developing plants, germinating, and/or germinated seeds and the rack can be part of an aeroponic or hydroponic system.

Embodiments of the disclosure can include a method of container rack latch system operation that can include the acts or steps of applying a first force to a first container on support surfaces of a container rack latch system to translate the first container to a position between gates of the rack container rack latch system with the gates in an extended position and wherein the container is free from contact and/or overlap with the gates. The method can further include applying a second force to a force transfer structure on a proximal gate of the container rack latch system to move the proximal gate and the linked opposing gate from the extended position to a retracted position.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION

Figure 1:
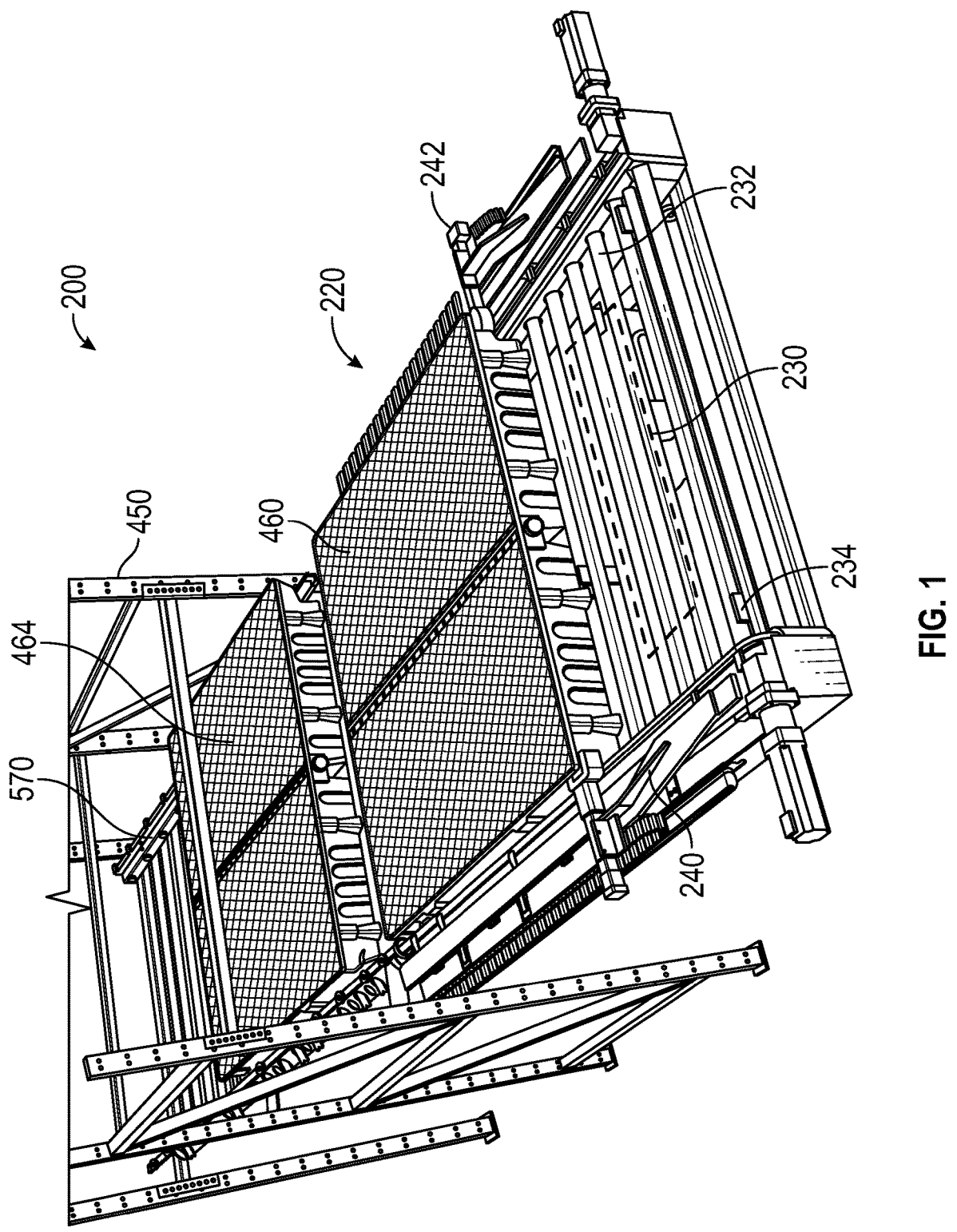
FIG. 1 illustrates an embodiment of a container transfer system.

Embodiments of the disclosure can include a container transfer system 200 that can include a container transfer carriage 220. The container transfer carriage can have a supporting surface 230 capable of receiving and transferring a container 460 along the supporting surface 230 of the transfer carriage 220 and can include actuatable stops 234, 236 near the proximal end 224 and near the distal end 226 of the supporting surface 230 of the container transfer carriage 220. The actuatable stops 234, 236 can extend or otherwise protrude above the supporting surface 230, for example from roller 232, from the sides of the transfer carriage 220, or between rollers 232. The stops 234, 236 can permit transfer of the container 460 onto the carriage supporting surface 230 between the stops 234, 236 without stop actuation (e.g. the container can push the stops 234, 236 open as the container 460 is moved onto surface 230 and between the stops 234, 236. The stops 234, 236 can permit transfer of a container 460 initially positioned between locked stops 234, 236 beyond the supporting surface 230, (e.g. the container 460 can be moved to another carriage or into a rack 450) when one or more of the stops are actuated, unlocked, or retracted, thereby allowing transfer or translation of the container 460 away from between the stops 234, 236.

The container transfer carriage 220 can further include a manipulator 240 that can engage the container 460. The manipulator 240 can translate along a length of the container transfer carriage 220 and is adapted to translate the container 460 along the supporting surface 230. The container transfer carriage 220 can further include a latch actuator mechanism 290 that can retract and extend gates of a container rack latch system 580 connected to a rack 450. The rack 450 can be configured with the container latch system to removably receive one or more of the containers (460, 464, etc.) between the gates and on a supporting surface 570 of the container rack latch system 580. The container transfer carriage 220 and the latch actuator mechanism 290 can act cooperatively to load the container from the container transfer carriage 220 to the supporting surface 570 and the container transfer carriage 220 and the latch actuator mechanism 290 operate cooperatively to unload the container from the supporting surface 570 to the carriage 220. The container transfer carriage 220 and the latch actuator mechanism 290 of the container transfer carriage 220 can act cooperatively to load the container 460 from the container transfer carriage 220 to the supporting surface 570 and the container transfer carriage 220 and the latch actuator mechanism 290 operate cooperatively to unload the container 460 from the supporting surface 570 to the carriage 220. In some embodiments of the disclosure the latch actuator mechanism 290 can reversibly move towards and away from the carriage 220.

Figure 12:
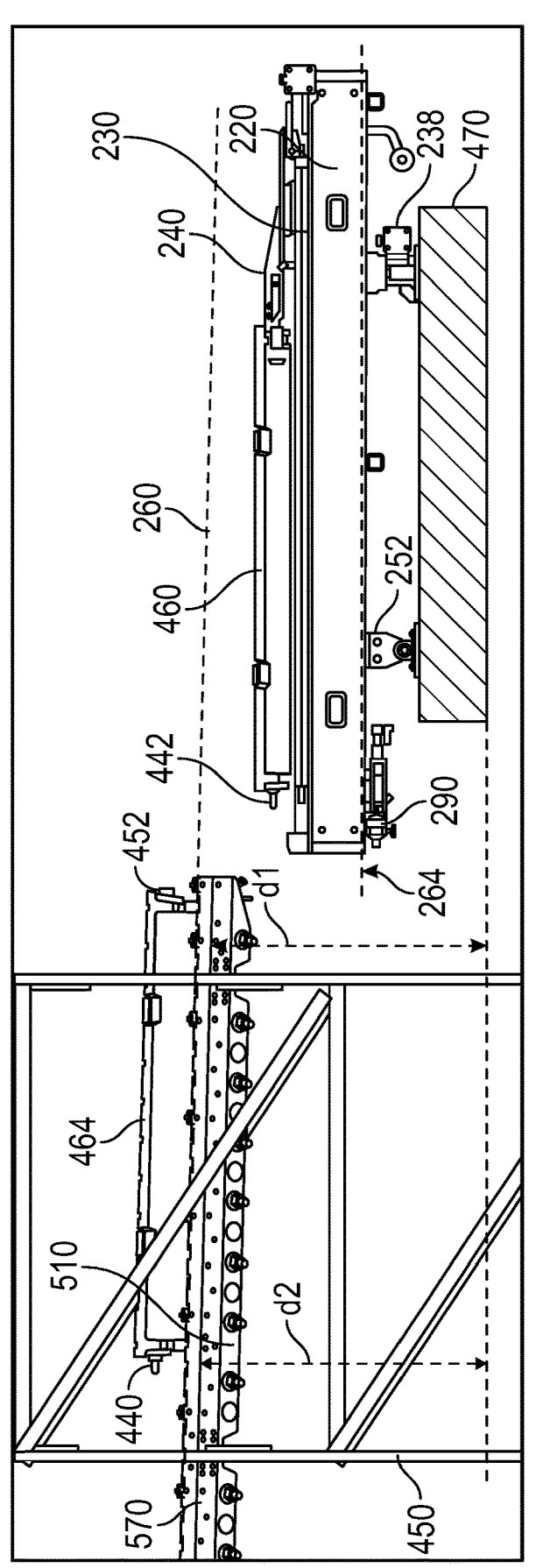
FIG. 12 illustrates a side view of a container transfer system.
Figure 13:
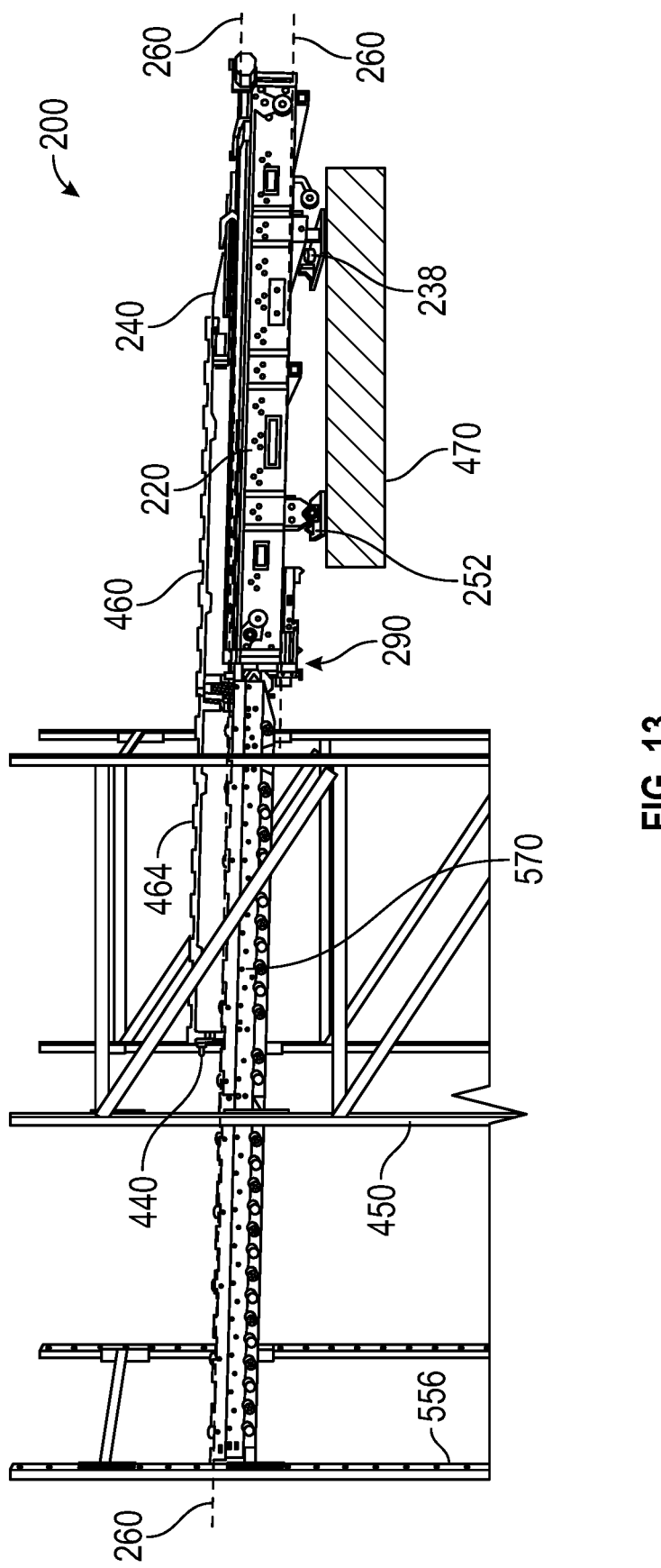
FIG. 13 illustrates a side view of a container transfer system.

In embodiments of the disclosure the container transfer carriage 220 can includes a pivot mechanism 238, 252 adapted to position the supporting surface 230 of the carriage between an orientation 264 parallel to a horizontal surface 470 (FIG. 12) and an orientation parallel 260 to the supporting surface 570 of the rack (450, FIG. 13). The pivot mechanism (238, 252) can include a pivot point 252 fixtured or disposed below the carriage supporting surface 230 and a reversible lift assembly 238 spaced from the pivot point 252 that raises and lowers an end of the transfer carriage. In some embodiments of the container transfer system the reversible lift assembly 238 can include a pivot roller drive 212 connected to a roller 210 and a roller ramp 218 (see, e.g., FIG. 8). The roller drive 212 can move the roller 210 against or along a roller ramp 218 to raise and lower an end of the carriage (see FIG. 8 which is a view from proximal end 224). For example, the roller ramp 218 can include a horizontal section and an angled section extending from the horizontal section. When the pivot roller 210 is positioned against the horizontal section of the roller ramp 218, the supporting surface 230 of the carriage is maintained in an orientation substantially parallel to horizontal surface 470 (e.g., the top plane defined by the supporting surface 230 is substantially parallel to horizontal surface 470). When the pivot roller 210 is actuated to move and be positioned against the angled section of the roller ramp 218, the supporting surface 230 of the carriage is angled relative to horizontal 470 and oriented parallel 260 to the supporting surface 570 of the rack 450. In some embodiments, the position of the pivot roller 210 relative to the horizontal and angled sections can be selectively and gradually adjusted as the carriage is elevated adjacent to a specific supporting surface 570 of the rack 450. The reversible lift assembly 238 can further include a guide member 214 and a guide roller 216 that contact the guide. The guide member 214 and a guide roller 216 can maintain alignment of the carriage supporting surface 230 and can prevent side to side movement of the carriage supporting surface 230 as the end of the carriage 220 is raised and lowered.

In some embodiments of the disclosure the latch actuator mechanism 290 can be connected to the container transfer carriage 220 and the latch is adapted to engage the container rack latch system 580 on the rack 450. The latch actuator mechanism 290 can reversibly extend and retract from the container transfer carriage 220 and cooperates with one or more manipulators 240 of the container transfer carriage 220 to transfer or translate a container 460 from the container transfer carriage 220 onto the support surface 570 of the container rack latch system 580.

Figure 9:
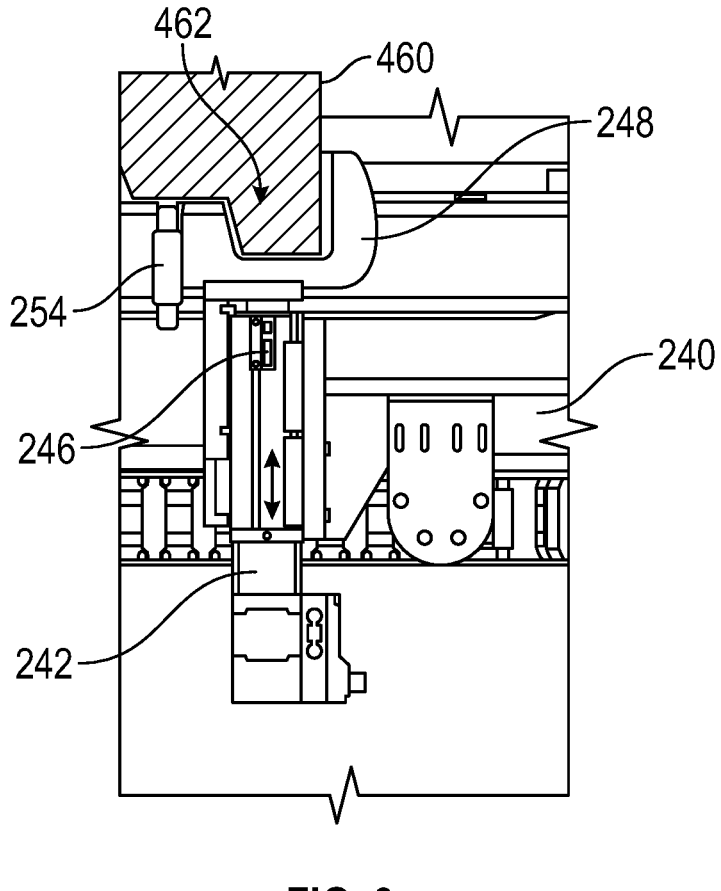
FIG. 9 illustrates a top down view of a carriage manipulator.

In embodiments of the disclosure the container transfer carriage 220 can have one or more manipulators 240 that can further include a gripper actuator 242 for positioning a gripper 248 against one or more sides, or opposing sides, of the container (460, FIG. 9). The one or more manipulators 240 can be configured to move the container 460 along the transfer carriage supporting surface 230 towards and away from the supporting surface 570 of the container rack latch system 580 of the rack 450.

Figure 3:
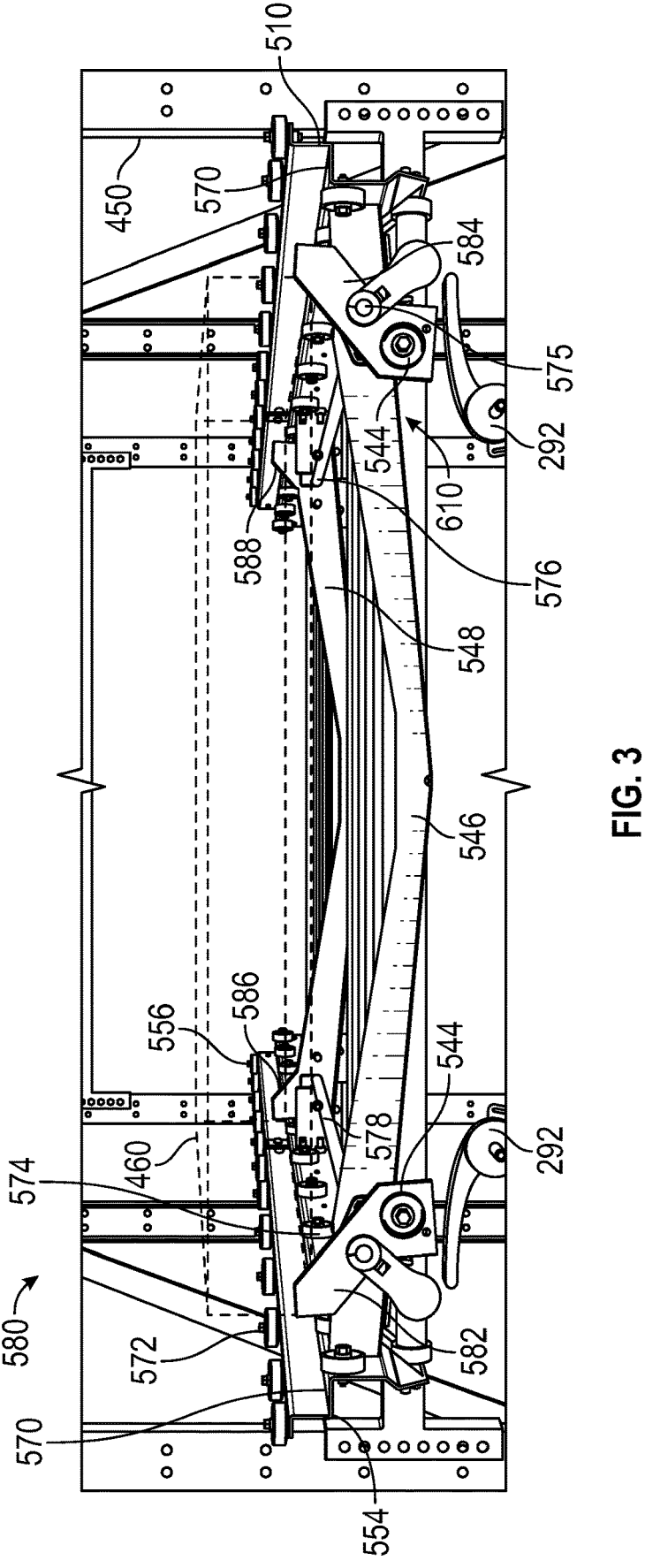
FIG. 3 illustrates a container rack latch system.
Figure 4:
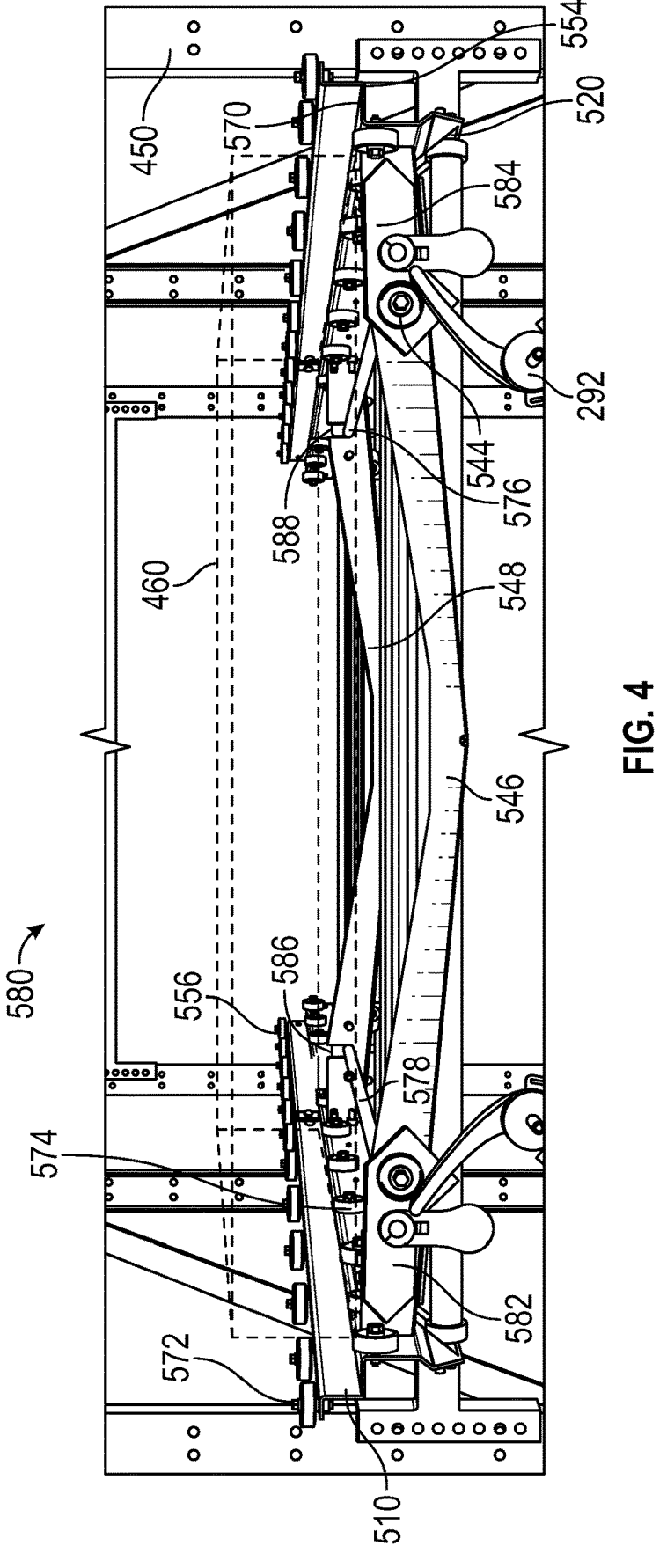
FIG. 4 illustrates a container rack latch system.

In some embodiments of the disclosure the container rack latch system 580 can include one or more rotatable gates 582, 584 at a proximal end 554 of the rack and an opposing one or more rotatable gates 586, 588 spaced from the proximal end of the rack 450 (see, e.g., FIG. 3). The rack 450 can have a distal end 556. In some embodiments of the disclosure including rotatable gates, the rotatable gates 582, 586 can be linked by a rotatable shaft 578 and the rotatable gates 584, 588 can be linked by rotatable shaft 576. Based on such linkage, the gates 582, 586 rotate simultaneously as a pair, and the gates 584, 588 rotate simultaneously as a pair. The one or more rotatable gates 582, 584 at the proximal end of the rack 450 can be selectively positioned in an extended orientation protruding above a plane defined by the supporting surface 570 of the container rack latch system 580, and the one or more rotatable gates (584, 588) can be selectively positioned in a retracted orientation extending below the plane defined by the supporting surface 570 the container rack latch system 580 (FIG. 3 and FIG. 4). In an extended position, the gates can prevent transfer of containers 460 away from between the gates or prevent transfer of containers to a position between the gates (e.g., preventing movement of a container off of the supporting surface 570 or movement of a container onto the supporting surface 570). In a retracted position, containers 460 can be moved away from between the retracted gates or moved to a position between the gates in a non-overlapping position with the gates (e.g., containers can be moved onto the supporting surface 570 or off of the supporting surface 570). In the extended orientation, one or more of the rotatable gates 582, 584 can prevent transfer of the growing container 460 from the container transfer carriage 220 to the supporting surface 570. In the retracted orientation, the one or more proximal rotatable gates 582, 584 allows transfer of the growing container 460 from the carriage 220 to the container rack latch supporting surface 570 mounted within the rack 450. (FIG. 4). In some embodiments of the disclosure the container 460 can be a growing container 460 that includes one or more developing plants, germinating, and/or germinated seeds. The rack 450 can be part of an aeroponic or hydroponic system.

Embodiments of the disclosure can include a method of container transfer system 200 operation that can include the acts or steps of transferring a container 460 between a supporting surface 230 of a container transfer carriage 220 and a support surface 570 of a container rack latch system 580. The container rack latch system can be positioned within a rack 450 and the container transfer carriage can include or comprise one or more manipulators 240. The method can include the acts or steps of sequentially or concurrently operating the one or more manipulators 240 of the container transfer carriage 220 and the container rack latch system 580 to load the container 460 from the container transfer carriage 220 onto the supporting surface 570. The method in embodiments of the disclosure can include positioning the supporting surface 230 of the container transfer carriage 220 in an orientation parallel to the supporting surface 570.

Embodiments of the method of operating the container transfer system 200 can further include releasing carriage stops 234, 236 of the container transfer carriage 220 wherein the carriage stops 234, 236 can reversibly restrict and permit movement of container 460 along the supporting surface 230. In some embodiments of the method, the container 460 can be positioned against stop 236 and the stop 236 can restrict further movement of the container 460 on the supporting surface 230 until the stop 236 is actuated or released.

Figure 7:
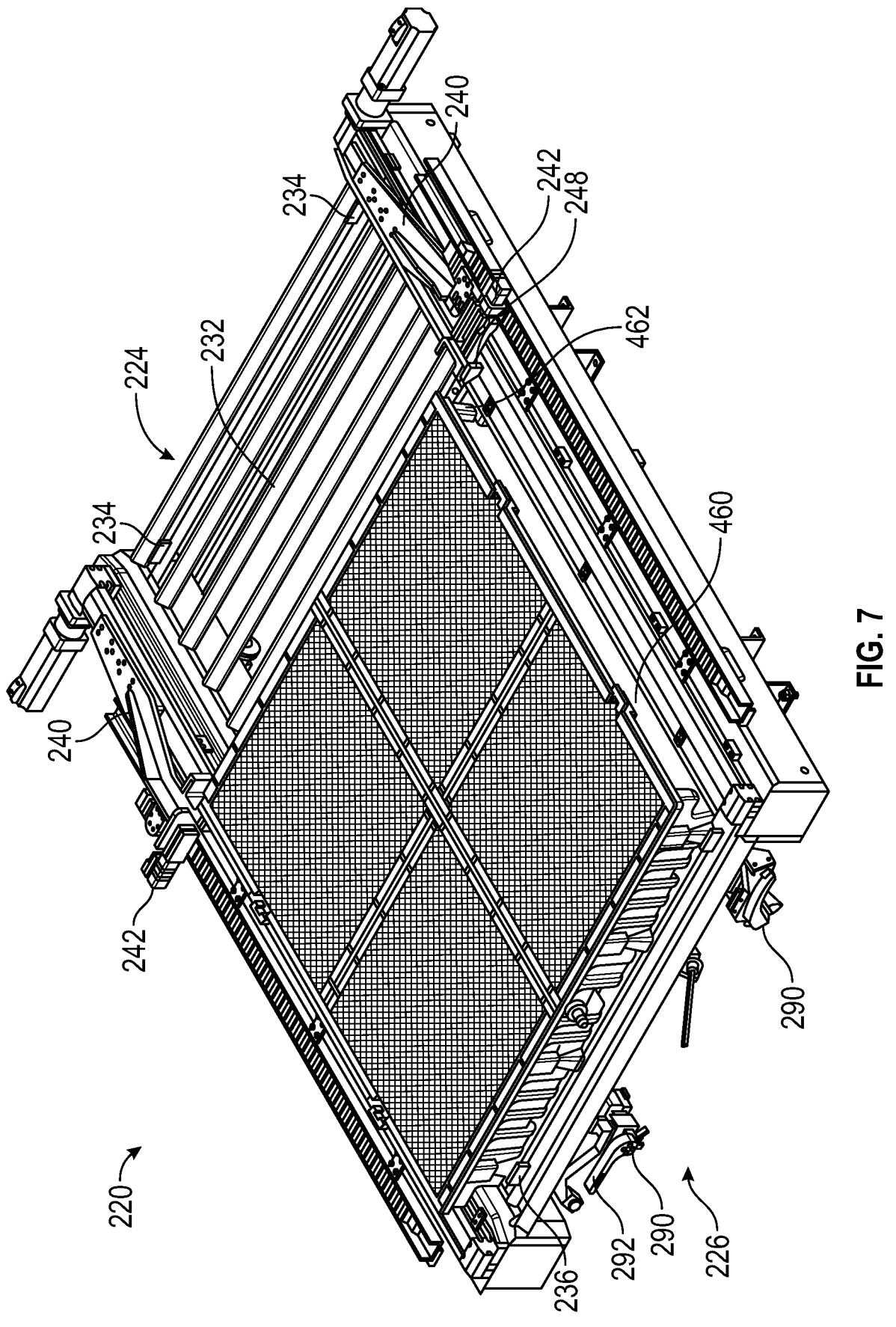
FIG. 7 illustrates a perspective view of an embodiment of a container transfer carriage.

Embodiments of the method of operating the container transfer system 200 can include a container transfer carriage 220 that can further include a latch actuator mechanism 290. The latch actuator mechanism 290 can be connected to the container transfer carriage 220 below the carriage supporting surface 230 as illustrated in FIG. 7 and FIG. 12. The latch actuator mechanism 290 comprises one or more latches adapted to reversibly engage with and disengage from the one or more pairs of spaced gates 584, 588 of the container rack latch system 580 to extend and retract the gates 584, 588. The one or more pair of spaced gates comprises a proximal end gate 584 and a gate spaced from the proximal end 588; the spacing between the gates larger than a dimension of the container 460. The proximal end gate 584 and the gate 588 spaced from the proximal end of the one or more paired gates can be mechanically coupled together by a shaft 578 with an axis of rotation 575 (FIG. 3, FIG. 4).

In embodiments of the method of operating the container transfer system 200, the one or more pairs of gates 584, 588 can be in an extended orientation protruding above a plane defined by the container supporting wall or surface 570 (of the light and container support 510) or positioned in a retracted orientation extending below the plane defined by the supporting surface 570. (FIG. 3 and FIG. 4). In the extended orientation, the one or more pairs of gates 584, 588 can restrict transferring of the container 460 between the container transfer carriage 220 to the supporting surface 570 within the rack 450. In the retracted orientation, the one or more pairs of gates 584, 588 enables transferring of the container 460 between the container transfer carriage 220 to the supporting surface 570 within the rack 450.

Figure 19:
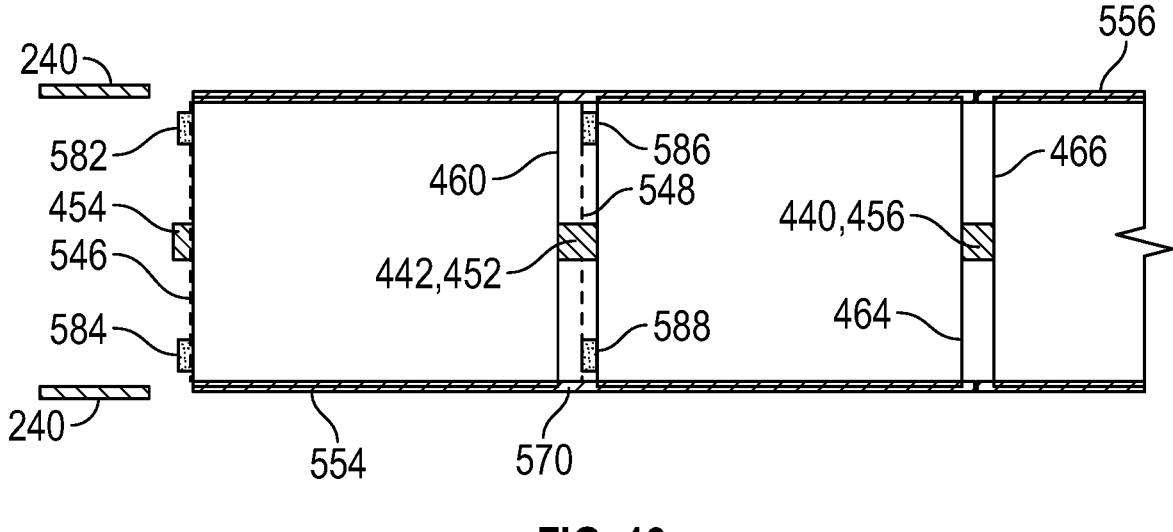
FIG. 19 is a schematic illustration of a top down view of a rack and a container transfer system.

In some embodiment of the method of operating the container transfer system 200 the method can include positioning the one or more pairs of gates 584, 588 in the retracted orientation (FIG. 4). During the step of moving the container 460, the container 460 can optionally be fluidly mated with one or more second containers 464, with the one or more manipulators 240. The one or more containers 460 can be moved from the supporting surface 230 of the container transfer carriage 220 to the supporting surface 570 of a container rack latch system 580 such that container 460 is in a non-overlapping position and between the gates 584, 588 and the container 460 is positioned on the supporting surface 570. Once the container 460 has been moved onto the supporting surface 570, in a non-overlapping position between gates 584, 588, the first and second pair of rotatable gates 582, 584 are actuated to be positioned in the extended orientation (FIG. 3) and the one or more manipulators 240 are actuated to retract. The extended gates 582, 584 thereby position the container 460 between the gates on the supporting surface 570 as illustrated in FIG. 19.

In some embodiments of the disclosure the one or more manipulators 240 can be positioned against opposing sides of the container 460, one or more stops 234, 236 can be released or actuated in a direction of travel of the container 460, and the one or more manipulators 240 can be actuated to move the container 460 in the direction of travel along the carriage supporting surface 230 towards or away from support surface 570 of the container rack latch system 580 within the rack 450.

Figure 17:
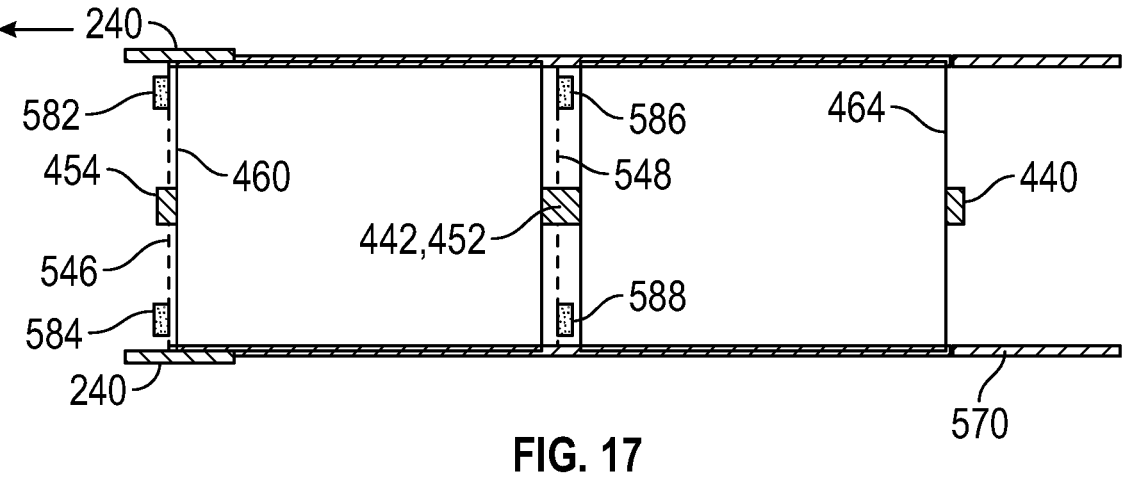
FIG. 17 is a schematic illustration of a top down view of a rack and a container transfer system.
Figure 18:
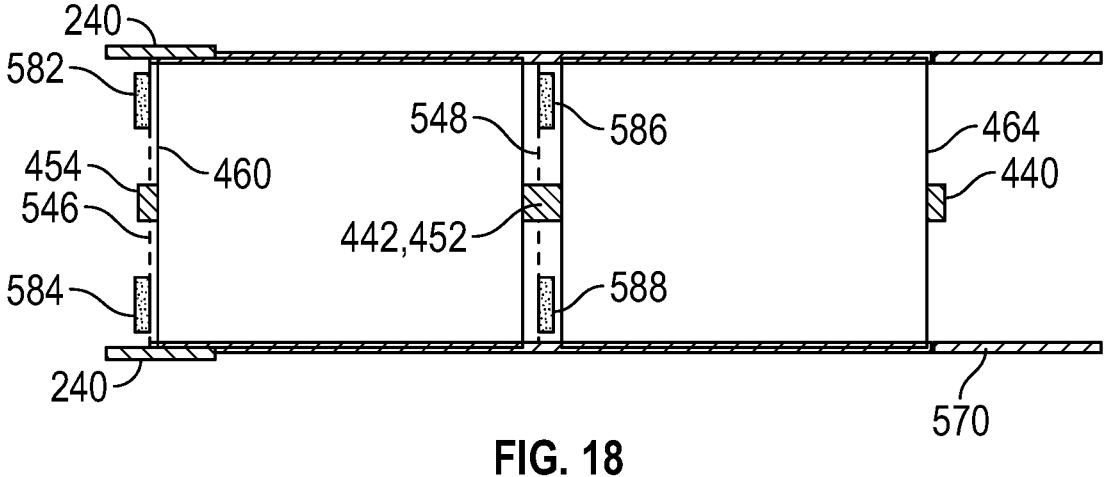
FIG. 18 is a schematic illustration of a top down view of a rack and a container transfer system.

Embodiments of the disclosure of the container transfer system 200 can include a container transfer carriage 220 comprising a carriage transfer surface 230 that can translate a container 460 from a first end region 224 of the carriage toward a second end region 226 of the carriage 220. The transfer carriage 220 can have at least a first reversible stop 234 near the first end region of the carriage 220 that can have a portion above or protruding out above the carriage transfer surface 230 and at least a second reversible stop 236 positioned near the second end region of the carriage 220 that can have a portion above or protruding out above the carriage transfer surface 230. The container transfer carriage 220 can further have a latch actuator mechanism 290 adapted to extend and retract one or more of a proximal gate 584 and a gate separated from the proximal gate 588 of a container rack latch system 580 that is connected to a rack 450. The gates 584, 588 can be separated within the container rack latch system by a dimension of the container 460. The carriage 220 can also include one or more manipulators 240 that can engage a surface of the container 460. The manipulator 240 can reversibly translate from the first position near the first end region 224 of the carriage 220 past the second end region 226 of the carriage 220 while engaging the container 460. The manipulator 240, the latch actuator mechanism 290, and the second stop 236 can cooperate together to enable transfer of the container 460 from the carriage transfer surface 230 onto a supporting surface 570 of the container rack latch system 580 within the rack 450. The manipulator 240 can position the container 460 to a location past or beyond the one or more proximal gates 584 and before the one or more gates separated from the proximal gate 588, the container being in a non-overlapping relationship with the gates, whereby the gates 584,

588 can be extended (e.g. FIG. 18). The container 460 positioned past the proximal gate 584 and before the gate separated from the proximal gate 588 is positioned between the gates 584, 588 is free of contact or overlap with the gates 584, 588 in the extended and retracted positions (FIG. 17, FIG. 18). In this position, the gates are not in contact with the opposing ends of the container 460, with the gates positioned immediately adjacent to and spaced from the ends of the container 460. In other embodiments of the container transfer system 200, the container 460 can also be positioned between the separated external gates 584, 588 with the container 460 in contact with at least one gate (584 unloading or 588 loading) in an extended position (e.g. see FIG. 16, FIG. 19).

In some embodiments of the container transfer system 200 of the disclosure, the latch actuator mechanism 290 can be positioned beneath the carriage transfer surface 230. The latch actuator mechanism 290 in some embodiments of the disclosure can further include a lever arm 292 that can interacts with at least one force transfer structure (244) on the one or more proximal gates 584 to reversibly move/ leverage the gate between extended and retracted positions. The container rack latch system 580 can be positioned within the rack 450 and can include a first pair of a proximal gate 584 and a gate separated from the proximal gate 588 and a second pair of a proximal gate 582 and a gate separated from the proximal gate 586. The first pair of rotatable gates 584, 588 can be linked together by a rotatable shaft and the second pair comprise rotatable gates 582, 586 can linked together by rotatable shaft (576, 578, see FIG. 3, FIG. 4).

Still other embodiments of the container transfer system 200 of the disclosure can include a container transfer carriage 220 comprising a carriage transfer surface 230 that translates a container 460 from a first end region 224 of the carriage toward a second end region 226 of the carriage 220. The transfer carriage 220 can include a first reversible stop 234 near the first end region of the carriage 220 that can have a portion above the carriage transfer surface 230 and a second reversible stop 236 located near the second end region of the container transfer carriage 220 that can have a portion above the carriage transfer surface 230. The container transfer carriage 220 can also include a carriage pivot mechanism (238, 252) that raises and that lowers an end of the container transfer carriage 220 and the carriage transfer surface 230 from a horizontal position where the first end of the carriage 220 and the second end of the carriage 220 are at the same height (FIG. 10) to a tilted/angled position where the first end of the carriage 220 and the second end of the carriage 220 are at different heights (FIG. 12). The carriage pivot mechanism 238, 252 can include a pivoting structure 252 and a carriage height adjustment apparatus 238. The container transfer carriage 220 in some embodiments can include a latch actuator mechanism 290 that can be adapted to open or close one or more pairs of separated gates 584, 588 of a rack latch system 580. The container transfer carriage 220 can have a manipulator 240 that reversibly translates from the first end (pop-up) region 224 of the carriage 220 past the second (tower) end region 226 of the carriage 220 and the manipulator 240 can engage with a surface of the container 460 to translate it across the support surface 230. The container transfer carriage 220 can further include a carriage controller that can have a carriage controller processor and a non-transitory computer readable medium storing a set of control instructions executable by the processor to control operation of the container transfer carriage 220. The set of control instructions can instruct the carriage 220 to perform the following acts or steps including: translating the manipulator 240 engaged with a surface of the container 460 on the support surface 230 to position the container 460 on the support surface 570 in a non-overlapping (FIG. 18) or non-contacting (FIG. 17) position between connected retracted or extended separated gates 584, 588 of a container rack latch system 580. Once positioned between the separated gates 584, 588 in the non-overlapping (FIG. 18) or non-contacting (FIG. 17) position, the carriage controller can further operate the latch actuator mechanism 290 to open and close the separated gates 584, 588. In some embodiments of the container transfer system 200 of the disclosure, the separated gates 584, 588 in each pair can be rotatable and the separated gates can be linked together by a rotatable shaft.

The carriage controller steps in some embodiments of the disclosure can further include translating the manipulator 240 engaged with the container 460 to position the container in non-touching relationship between the separated gates 584, 588 of the container rack latch system 580 and operating the latch actuator mechanism 290 to open and close opposing separated gates 584, 588.

The carriage controller steps or acts in some embodiments of the disclosure can further include releasing the second stop 236; and translating the manipulator 240 engaged with the container 460 to transfer the container from the first end region 224 of the carriage transfer surface past the second stop 236.

The carriage controller steps in some embodiments of the disclosure can further include determining a position of a container 464 within the container rack latch system 580 between the separated gates 584, 588 and instructing the manipulator 240 to advance or retract.

Embodiments of the disclosure can include a method of loading and unloading containers from a container transfer system 200. The method can include moving a container 460 engaged by one or more manipulators 240 of a container transfer carriage 220 onto or away from a container supporting surfaces 570 or 574 of a container rack latch system 580. In the method, the container can be moved from a first position between a pair of gates in an extended position (e.g. gates 584, 588, see FIG. 19) wherein the container 460 is touching at least one gate 584 at a proximal end 554 of the rack, to a second position (see FIG. 20) wherein the container 460 is free of contact with the gate 584 at the proximal end and free of contact with the gate 588 separated from the proximal end. The method can further include the act or step of retracting the pairs of gates (e.g. gate pairs 584, 588, see FIG. 18) at or below the container supporting surfaces 570 or 574 and translating the container 460 to a third position along the supporting surface 570 or 574.

In some embodiments, the container supporting surfaces 570 or 574 of the container rack latch system 580 positioned within the rack 450 can be sloped such that a distance (d2) from the supporting surface 570 or 574 to a horizontal surface 470 near a second end latch support 548 of the rack latch system is greater than a distance (d1) from the supporting surface 570 or 574 to the horizontal surface 470 near the first end latch support 546 of the rack latch system.

A rack in embodiments of the disclosure can refer to a framework, typically with rails, bars, and other framing members connected together that can provide storage and housing of containers within the rack. A tower in embodiments of the disclosure can refer to a tall structure, such as a rack with one or more levels or a stack of racks, that can house containers or trays. The containers or trays housed in the racks and towers can be used for storage, shipping, or growing plants in vertical farming systems. Embodiments of the disclosure include a container rack latch system and a container tower container rack latch system (hereinafter referred to as "a container rack latch system") that provides for the transfer of containers into and away from the rack or tower as well as positioning, storage, and housing of containers therein. Embodiments of the disclosure can include a container or tray transfer carriage that provides for the transfer of containers/trays into and away from the rack or tower as well as positioning, storage, and housing of containers/trays therein. The containers/trays housed in the racks and towers can be used for storage, shipping, or growing plants in vertical farming systems. Aeroponic and hydroponic grow systems can be configured as racks or towers. The terms rack and tower can be used interchangeably throughout the disclosure. The term container can refer to structures for holding articles, plants, grow media, and the like that can have a greater depth than a tray. The terms containers and trays can be used interchangeably throughout the disclosure.

Embodiments of the present disclosure can also provide a container transfer carriage 220 that can include a supporting surface 230 adapted to receive and transfer a container 460 along the supporting surface 230 of the carriage 220 and one or more actuatable stops 234 near the proximal end 224 of the supporting surface and one or more actuatable stops 236 near the distal end of the supporting surface. The stops 234, 236 can have features positioned above the supporting surface 230. The stops can permit transfer of the container 460 onto the carriage supporting surface 230 between the stops 234, 236 without stop actuation and the stops 234, 236 can permit transfer of the container 460 positioned between the stops 234, 236 beyond the supporting surface with stop actuation. The container transfer carriage 220 can further include one or more manipulator(s) 240 that can engage the container 460. The one or more manipulators 240 can translate along a length of the carriage 220 and the one or more manipulators 240 can be adapted to translate the container 460 onto or away from the supporting surface 230. The container transfer carriage 220 can further include a latch actuator mechanism 290 adapted to retract gates mounted to or configured with external rack or tower 450. In some embodiments of the disclosure the latch actuator mechanism 290 can reversibly extend and retract from the container transfer carriage 220. The latch actuator mechanism 290 can cooperate with the one or more manipulators 240 of the carriage 220 to move containers 460 into and away from a supporting surface 570 of the container rack latch system 580.

Embodiments of the container transfer carriage of the disclosure can further include a pivot mechanism 238, 252 that can have a pivot point 252 fixtured below the carriage surface and a reversible lift assembly 238 spaced from the pivot point that raises and lowers an end of the transfer carriage. The pivot mechanism 238, 252 can be adapted to position the supporting surface 230 of the carriage between a first position that is substantially parallel 264 to a horizontal surface 470 (e.g. see FIG. 12) and a second position 260 that is substantially parallel to a container supporting surface 570 of the rack (e.g. see FIG. 13). In the second position 260, the supporting surface 230 and the supporting surface 570 can be substantially aligned for height and substantially parallel to allow for smooth passage of a container 460 therebetween.

Embodiments of the disclosure can include methods of using the container transfer system 200 to accurately position containers 460 within racking systems as well as positioning growing containers within aeroponic and/or hydroponic grow systems, racks, and towers. The method of container transfer carriage 220 operation can include the acts or steps of engaging the container(s) with a manipulator of the container transfer carriage and transferring the container 460 toward or away from a distal end 226 of a supporting surface 230 of the container transfer carriage 220. The method can further include operating a latch actuator mechanism 290 of the container transfer carriage 220 that is adapted to retract a gate on a tower or rack 450 and operating the one or more manipulators 240 of the container transfer carriage 220 to transfer the container 460 toward or away from the distal end 226 of the supporting surface 230 of the container transfer carriage 220. The method of container transfer carriage 220 operation can further include orienting the supporting surface 230 of the container transfer carriage parallel to a container supporting surface 570 or another external carriage (e.g. FIG. 13 or pop-up transfer carriage (FIG. 12) not shown) to which the container(s) are transferred and/or received.

Some embodiments of the method of container transfer carriage 220 operation of the disclosure can further include the acts or steps of operating the one or more manipulators 240 of the carriage 220 to move the container 460 along the carriage supporting surface 230 towards and away from the rack 450 or other external transfer carriage and actuating a stop 234, 236 positioned above the carriage supporting surface 230 that permits the container 460 to travel in a direction (e.g. direction toward 224 or direction away from 226) beyond the supporting surface 230. The act or step of stop actuation releases the stop from a fixed or locked state and permits travel of the container 460 on the supporting surface 230 beyond the proximal 224 or distal 226 ends.

In other embodiments of container transfer carriage 220 operation of the disclosure, the method can further include the acts or steps of actuating the stop 236 near the distal end 226 of the supporting surface, the stop 236 positioned above the carriage supporting surface 230. Actuating the stop 236 releases the stop from being fixed and permits transfer of the container 460 away from the distal end 226 of the supporting surface 230 of the container transfer carriage 220 and towards the supporting surface 570 within rack 450. The method of container transfer carriage 220 operation of can further include fixing the stop 236 and positioning the container 460 against the stop 236.

In still other embodiments of container transfer carriage 220 operation of the disclosure the method can further include the acts or steps of actuating the stop 234 near the proximal end 224 of the supporting surface, the stop positioned above the supporting surface 230, wherein the actuating releases the stop from being fixed and permits transfer of the container 460 away from the proximal end 224 of the supporting surface 230 of the container transfer carriage 220 towards an external carriage (e.g., a pop-up carriage, not shown). The method of container transfer carriage 220 operation can further include wherein the stop 234 is fixed and the container is positioned against the stop 234.

Embodiments of the container transfer carriage 220 and method of container transfer carriage 220 operation can further include a carriage controller having a carriage controller processor and a non-transitory computer readable medium storing a set of control instructions executable by the controller processor to control operation of the container transfer carriage 220 to perform carriage controller steps. The carriage controller steps include operating the latch actuator mechanism 290 of the container transfer carriage 220 to retract the gates 584, 588 of the container rack latch system 580. The carriage controller steps can further include retracting the gates of a container rack latch system 580 and translating the manipulator 240 engaged with the container 460 to position the container on a support surface 570 of the rack between the retracted gates 584, 588. The rack support surface 570 can extend between the front and rear of the rack. The carriage controller steps can further include translating the manipulator 240 that engages the container 460 to a position whereby the container is in a non-touching contactless position between the gates (e.g. gates 584, 588, see FIG. 18) of the container rack latch system 580.

The carriage controller steps can further include operating the latch actuator mechanism 290 to extend and retract the opposing gates 584, 588. The controller steps can further include releasing the second stop 236 of the carriage 220 and translating the manipulator 240 engaged with the container 460 to transfer the container 460 past the second stop 236 and onto the supporting surface 570 with the gates in the retracted position.

Some embodiments of the carriage controller steps can further include engaging the carriage pivot mechanism to raise and lower an end of the container carriage 220 between the horizontal position 264 depicted in FIG. 12 where the first end of the carriage and the second end of the carriage are at the same height from the horizontal surface 470, and an angled position 260 as depicted in FIG. 13 where the first end of the carriage and the second end of the carriage are at different heights or distances from the horizontal surface 470.

Embodiments of the disclosure can include a container rack latch system 580. The container rack latch system can include a first gate 584 at a proximal end 554 of the system 580 and a second gate 588 spaced or separated from the proximal end of the system. The separated gate 584, 588 is configured to operate in an extended orientation (FIG. 3), wherein the gates can prevent transfer of a container 464 positioned on a container supporting surface 570 away from between the gates, and the separated gates 584, 588 can further be configured to operate in a retracted orientation (FIG. 4) that can permit transfer of the container away from the rack or further into the rack and beyond the gates.

Figure 15:
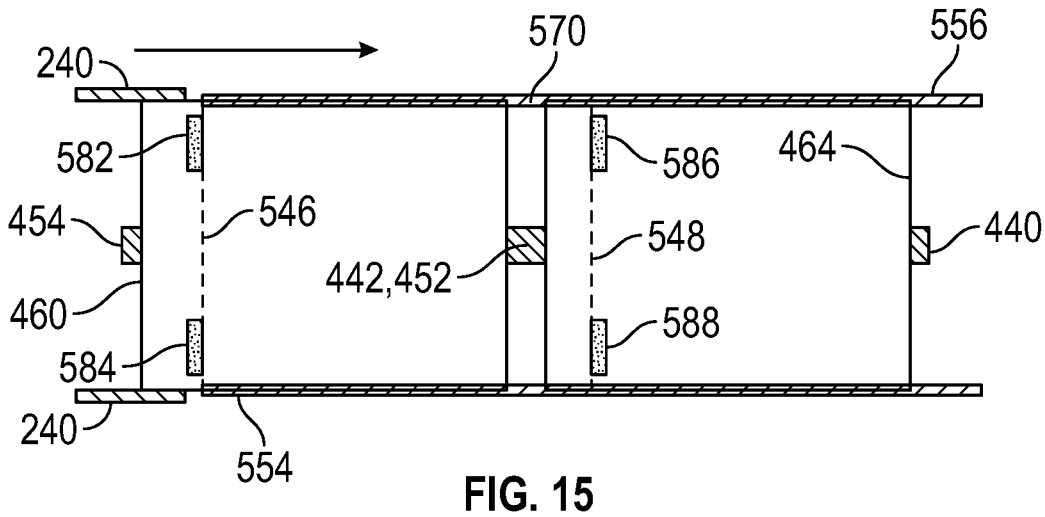
FIG. 15 is a schematic illustration of a top-down view of a rack and a container transfer system.

Some embodiments of the present disclosure provide a container rack latch system capable of retaining and indexing one or more containers into and within a rack or tower (FIG. 1). The container rack latch system 580, can include a container supporting surface 570 or a container supporting surfaces 574, a first gate 584 at a proximal end 554 of the system 580 and a second gate 588 spaced from the gate at the proximal end of the system. The separated gates can be configured to operate in an extended orientation wherein the gates are adapted to prevent transfer of a container positioned on the container supporting surface 570 or set of container supports 574 away from between the gates (e.g. FIG. 3, and also FIG. 16) into or out of the rack. The gates can be configured to operate in a retracted orientation (FIG. 4) wherein the gates are adapted to permit transfer of the container out of the rack or further into the rack and beyond the gates (FIG. 15). In embodiments of the container rack latch system 580, the first gate 584 and the second gate 588 in an extended position can protrude above the supporting surface 570 or above a set of container supports 574. The first gate 584 and the second gate 588 in a retracted position can be at or below the container support surface 570 (e.g., planes defined by the respective supports or surfaces) or at or below a first set of container supports 574.

In some embodiments of the disclosure, the container rack latch system 580 includes separated gates 584, 588 that can be configured to rotate together between the retracted and extended positions. The gates can be linked together in pairs (e.g. gate pairs 584, 588, or gate pairs 582, 586, etc.) and the gates of a pair can move between extended or retracted positions together. In some embodiments of the disclosure the separated gates in a pair can be linked physically or electronically to extend or retract together. In some embodiments of the disclosure the gates in a pair can be linked physically or mechanically by a rotatable latch shaft (576, 578).

In some other embodiments of the disclosure, the container rack latch system 580 can include the separated first gate and second gate 584, 588 that are configured to operate between the retracted and extended positions and further include a separated third gate and a fourth gate 582, 586 that are configured to operate between the retracted and extended positions. The third and fourth gates can be linked together by a rotatable shaft 578. The first and second gates 584, 588 can be separated from the third and fourth gates 582, 586 by a first end latch support 546 and a second end latch support 548 spaced from the first end latch support 546.

In still other embodiments of the disclosure, the container rack latch system 580 can be positioned or mounted within a rack 450. The container supporting surface 570 positioned within the rack can be sloped 260 such that a distance (d2) from the supporting surface 570 to a horizontal surface 470 near the second end latch support 548 is greater than a distance (d1) from the supporting surface 570 to the horizontal surface 470 near the first end latch support 546.

In embodiments of the container rack latch system 580 of the disclosure, one or more of the gates can include a force transfer structure 544 on the gate 582, 584. The force transfer structure can be spaced from a rotational axis 575 of the rotatable shaft 576. A latch actuator mechanism 290 can interact with the force transfer structure 544 on the gate 582, 584 and can operate to move the gates 584, 588 from the extended position (gates are above container support surface 570 or above container supports 574) to the retracted position (gates are below support surface 570 or below container supports 574).

Figure 20:
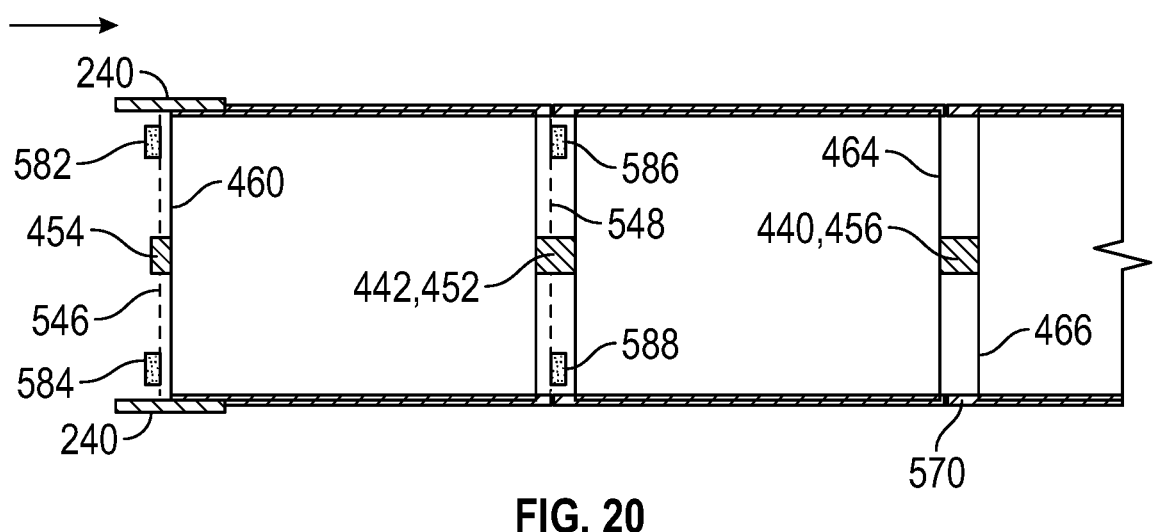
FIG. 20 is a schematic illustration of a top-down view of a rack and a container transfer system.

Embodiments of the disclosure can include a method of container rack latch system 580 operation that can include the acts or steps of applying a first force (e.g. force by a manipulator 240) to a first container 460 on a support surface 570 of a container rack latch system 580 to translate the first container to a position between gates 584, 588 of the rack container rack latch system 580 with the gates in an extended position and wherein the container is free from contact and/or overlap with the gates (e.g. see FIG. 20). The method can further include applying a second force (from latch actuator mechanism 290) to a force transfer structure 544 on a proximal gate 584 of the container rack latch system 580 to move the proximal gate 584 and the linked opposing gate 588 from the extended position to a retracted position.

Figure 21:
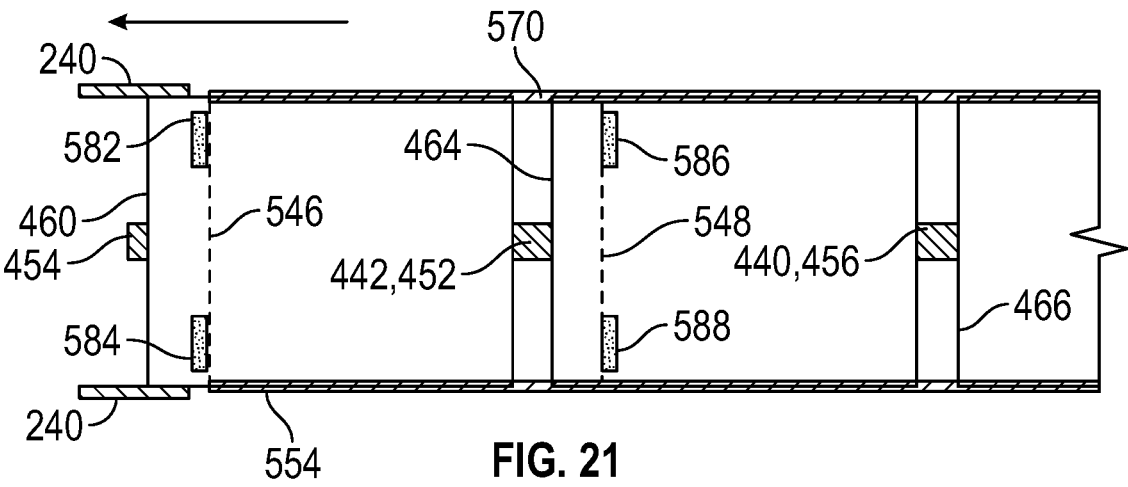
FIG. 21 is a schematic illustration of a top-down view of a rack and a container transfer system.

The method of container rack latch system 580 operation in embodiments of the disclosure can further include applying a manipulator force (e.g. force from manipulator 240) to the first container 460 to transfer the first container 460 along the container support surface 570 or container supporting surfaces 574 of the container rack latch system 580 with the gates 584, 588 in the retracted position (e.g. see FIG. 15 and/or FIG. 21).

The method of container rack latch system 580 operation in embodiments of the disclosure can include indexing the containers within the rack. In some embodiments the transfer of the first container into the rack indexes a second container out from between the gates in the retracted position (e.g. see FIG. 15) thereby positioning the second container in a non-overlapping position with the gates (e.g. see FIG. 16) and the first container between the gates. The position of the first container in the rack can be restricted by moving the gates from the retracted to the extended position. In other embodiments the transfer of the first container 460 away from between the gates at the proximal end of the rack can index a second container from within the rack into a position between the gates (e.g. see FIG. 21). The position of the second container in the rack can be restricted by moving the gates from the retracted to the extended position (e.g. see FIG. 22). The first container can be unmated/disengaged from the second container retained between the gates in the extended position (e.g. see FIG. 26).

The method of container rack latch system 580 operation can include retracting the gates using a latch actuator mechanism 290 that can have a lever arm 292. The lever arm can interact with a force transfer structure 544 on the gate 584 that can operate to reversibly move the gates 584, 588 from the extended position (above container support surface 570 or above top edge of support 546, 548)) to the retracted position (below surface 570 or below top edge of support 546, 548)) as illustrated in FIG. 3 and FIG. 4.

Figure 25:
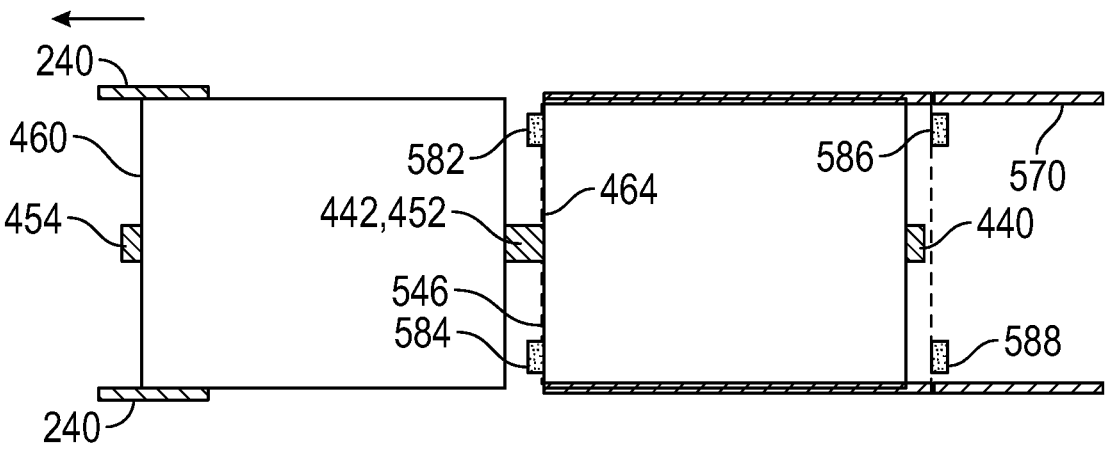
FIG. 25 is a schematic illustration of a top down view of a rack and a container transfer system.
Figure 26:
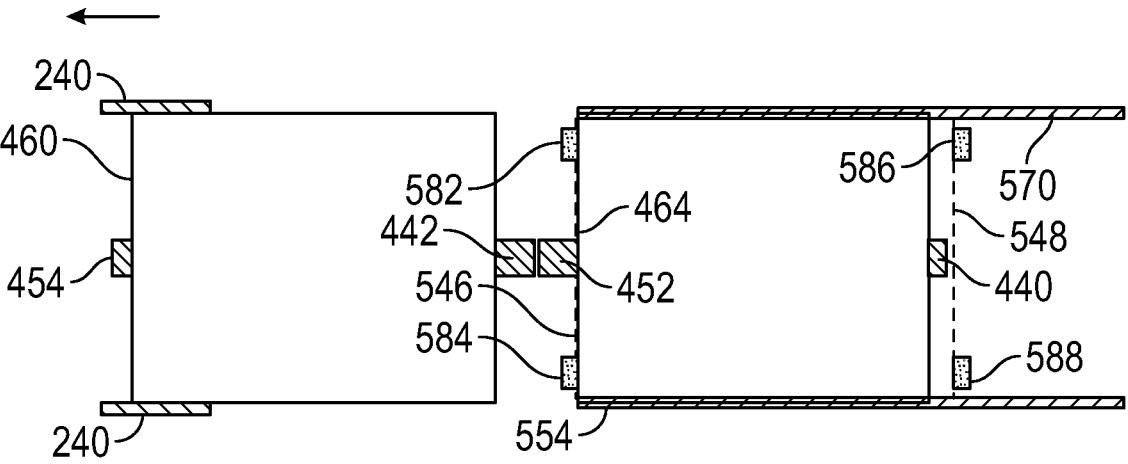
FIG. 26 is a schematic illustration of a top down view of a rack and a container transfer system.

The method of container rack latch system 580 operation can include the acts or steps of removing or decoupling the container 460 from a container 464 with the gates in a retracted position at the proximal end of the container rack latch system (e.g. see FIG. 26). The gates can be extended as shown in FIG. 25 which restricts movement of the container 464 between the gates. The container 460 is separated or decoupled from container 464 by applying a force (←) to container 460 towards the container transfer carriage 220 (not shown) and separating or decoupling the container 460 from the adjacent container 464 that is between the extended gates (e.g. see FIG. 26).

In some embodiments of the method of container rack latch system 580 operation, extending the gates from the retracted position to the extended position can include disengaging a latch actuator mechanism from the force transfer structure 544 on the proximal gate 584 of a container rack latch system 580.

Further embodiments of the disclosure can include a method of container rack latch system 580 operation that includes applying a first force to move a first container 460 to fluidly mate the first container 460 with a second container 464 on the supporting surface 570 or container supporting surfaces 574 of the container rack latch system 580. The second container 464 can be between a first gate 584 and a second gate 588. The first force can be applied to the container 460 until a distal end of the second container 464 contacts the second gate 588 spaced from the gate 584 at a proximal end 554 of the container rack latch system (e.g. see FIG. 22). The first force can then be removed or reversed which allows positioning the second container 464 between the proximal gate 584 and the gate 588 spaced from the proximal end (e.g. see FIG. 23); the container 464 can be free of contact with gates 584, 588 (e.g. see FIG. 23). The method can further include the subsequent act or step of retracting the gates 584, 588 of the container rack latch system 580 (e.g. see FIG. 24) whereby the container 464 can be translated from between the gates in either direction along the container support surface 570.

The method of container rack latch system 580 operation can further include applying a force from latch actuator mechanism 290 to a force transfer structure 544 on a proximal gate 584 of the container rack latch system 580 to move the proximal gate 584 and the linked opposing gate

588 from the extended position to a retracted position. The method can further include translating containers (e.g. translating containers 460, 464) along the container support 570 or container supports 574 with the gates in the retracted position.

A still further embodiment of the container rack latch system 580 of the disclosure can include a first gate 584, a second gate 588, and a shaft 576 rotatably connecting the first gate with the second gate and separating the first gate 584 from the second gate 588. The shaft 576 can pass through an opening in a first proximal end support 546 and can pass through an opening in a second end support 548 spaced from the first proximal end support 546. The first gate and the second gate can include a force transfer structure 544 connected to the first gate 584 and positioned separate from a rotational axis 575 of the shaft 576. In some embodiments the force transfer structure 544 can be a rotatable element. The shaft 576 can be connected to the gate 584.

In embodiments of the container rack latch system 580, the first gate 584 and the second gate 588 in an extended position can protrude above a top surface of the first proximal end support 546, a top surface of the second end support 548, and above the container support surface 570. The first gate 584 and the second gate 588 in a retracted position can be at or below a top surface of the first proximal end support 546, a top surface of the second end support 548, and at or below the container support surface 570.

The container rack latch system 580 in embodiments of the disclosure can further include a third gate 582, a fourth gate 586, and a shaft 578 rotatably connecting the third gate with the fourth gate and separating the third gate 582 from the fourth gate 586. The shaft 578 can pass through an opening in a first proximal end support 546 and can pass through an opening in a second end support 548 spaced from the first proximal end support. The third gate 582 can include a force transfer structure 544 that can be connected to the third gate 582 and positioned separate from a rotational axis of the shaft 578. The force transfer structure 544 can be a rotatable element. The shaft 578 can be connected to the gate 582.

In embodiments of the disclosure, one or more of the gates of the container rack latch system can have an uneven distribution of mass about the rotational axis (e.g. rotational axis 575) of the shaft 576 that can result in rotation of the gates from a retracted position to an extended position in the absence of an external force applied to the gates to maintain them in the retracted position. In embodiments of the container rack latch system 580 of the disclosure the first gate 584 and the third gate 582 can have a distribution of mass about the rotational axes of the shafts 576, 578 connected to the gates 582, 584 that can cause these gates to rotate from a retracted position with respect to the first end support 546 to an extended position with respect to the first end support 546 in the absence of an external force applied to the first and third gates.

FIG. 1 illustrates an embodiment of a container transfer system 200 that can include a container transfer carriage 220, an external tower or rack 450, and one or more containers (e.g. containers 460, 464). The containers 460, 464 can translated withing the rack 450 along a container support 570. The container transfer carriage 220 can include one or more translatable manipulator(s) 240, gripper actuators 242, rollers 232, and one or more actuatable stops 234. The rollers 232 can define portions of a carriage supporting surface 230 which is outlined in part by the dashed region. The carriage supporting surface 230 can support container 460 on the carriage 220.

Figure 2:
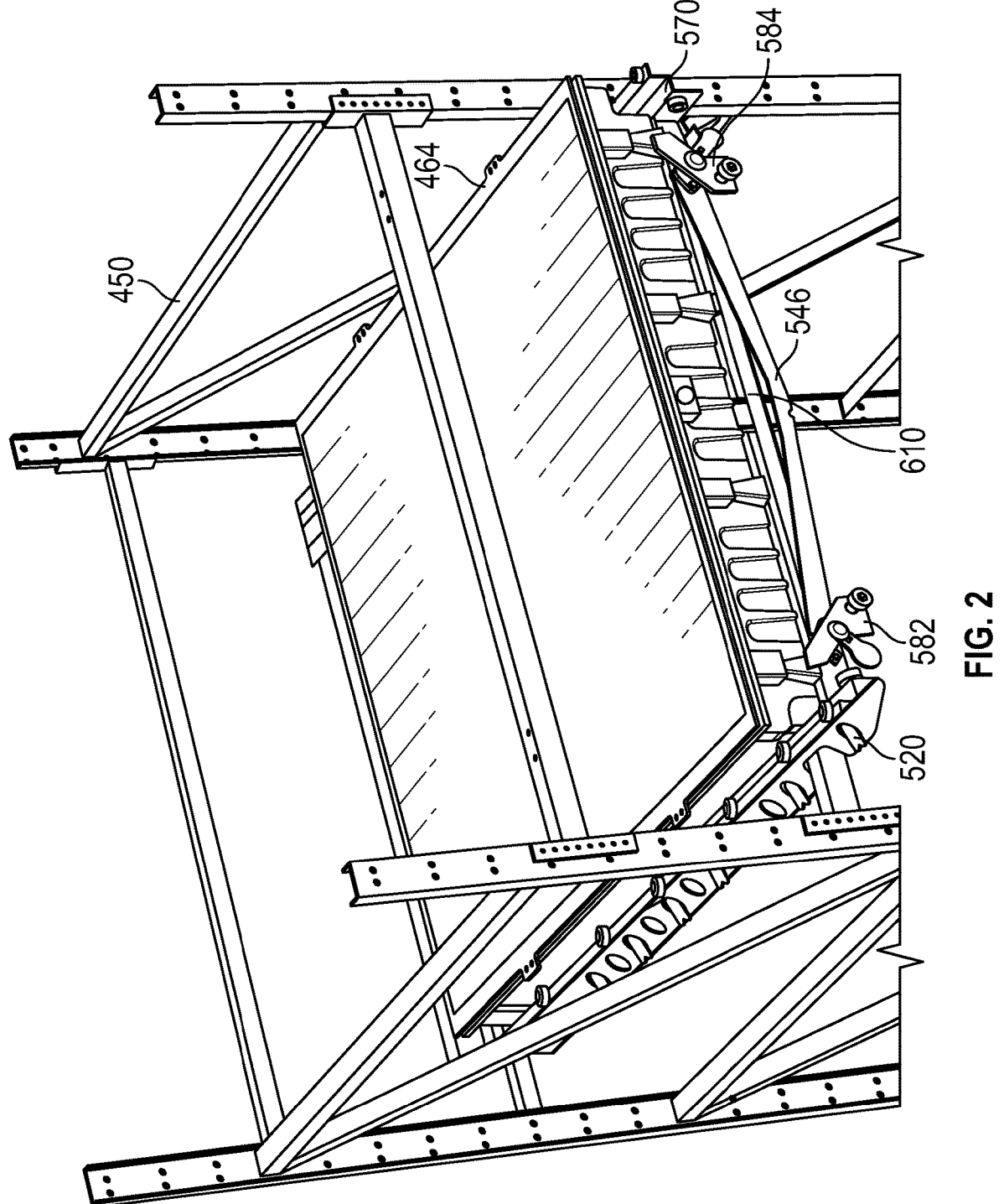
FIG. 2 is a perspective view from above a rack with a container supported on a container support surface of a container rack latch system.

FIG. 2 is a perspective view from above of a rack 450 with a container 464 supported on a container support surface 570. FIG. 2 illustrates gates 582 and 584 at a proximal end of the rack in an extended position. The spacing member 546 is positioned between gates 582, 584 and opposing container support surfaces 570.

FIG. 3 illustrates a container rack latch system 580 in an embodiment of the disclosure that can include a gate 582, 584 in an extended position at a proximal end 554 of the container rack latch system 580 and a gate 586, 588 in an extended position that can be spaced from the proximal end of the system. The space between the gates 584, 588 and 582, 586 can be sized to accommodate a container 460 without the container 460 touching either of the gates in the extended position. The gates 584, 588 and 582, 586 can be linked by a rotatable latch shaft 576, 578 respectively. The container rack latch system 580 can have one or more spacing member 546, 548. Spacing members 546, 548 can be positioned between supports 510 within the rack 450 to the support gates, one or more shafts 576, 578, and permit rotation of the gates and shafts. The container rack latch system 580 can have one or more light and container supports 510 that include a container supporting surface 570 or container supporting surfaces 574 on which the container 460 can be translated. In some embodiments the light and container supports 510 can further include a second set of container supports 572 rotatably coupled to the light and container supports 510. The light and container support 510 can be mounted or fixtured to framing members of a rack or tower 450. The gates 582, 584 can include a force transfer structure 544. The force transfer structure 544 can contribute additional mass to one side of the gate that results in an uneven distribution of mass about the rotational axis 575 of the shafts 576, 578. The uneven distribution of mass about the rotational axis 575 of the gates 582, 584 can cause the gate to rotate from a retracted position with respect to the first end support 546 to an extended position (see FIG. 2) in the absence of an external force applied to the force transfer structure 544 by the latch actuator mechanism 290. In some embodiments the container supports 510 can have openings 520 to support lighting lamps 610. The actuator mechanism 290, which can optionally have a lever arm 292 or other engagement mechanism, can interact with the force transfer structure 544 on the gate 582, 584 and can operate to move the gates 582, 584 from the extended position (above container support surface 570 or above container supports 574) to the retracted position (below surface 570 or below container supports 574).

FIG. 4 illustrates the container rack latch system 580 of FIG. 1 in an embodiment of the disclosure wherein the gates (582, 584, 586, 588) are in retracted positions. FIG. 4 illustrates action of a lever arm 292 of the latch actuator mechanism 290 against the force transfer structures 544 on the gates at the proximal end 554 that results in positioning the one of more pairs of linked gates (e.g. linked gates 582 and 586, 584 and 588) in the retracted position. With the one or more linked gates (e.g. linked gates 582 and 586, 584 and 588) in the retracted position the container 460 is unobstructed and free to move or be translated along the container support surfaces 570 or container supporting surfaces 574. The latch actuator mechanism 290 can be connected to the container transfer carriage below the carriage supporting surface (230, see also FIG. 7). The latch actuator mechanism 290 is adapted to reversibly engage with and disengage from one or more pairs of spaced gates 582, 584 of a container rack latch system 580 to extend and retract the gates 582, 584.

Figure 5:
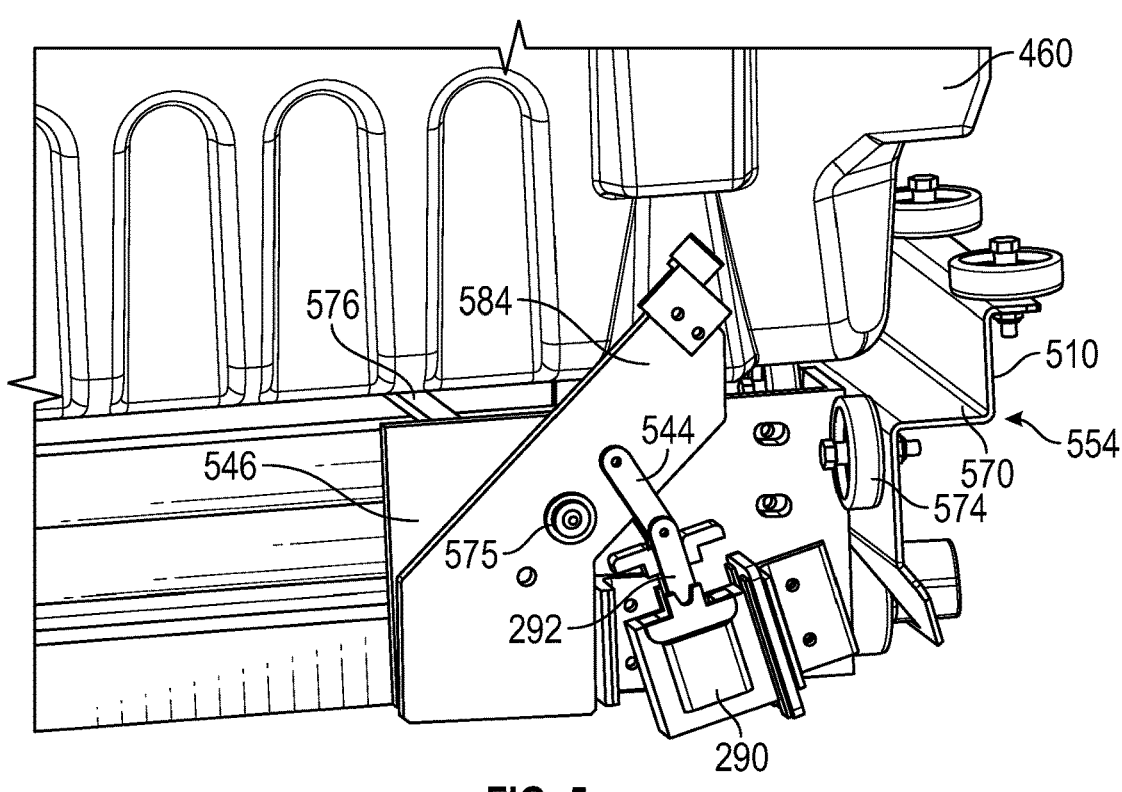
FIG. 5 illustrates a gate of a rack latch system.

FIG. 5 illustrates an embodiment of the disclosure having an electromagnetic or pneumatic latch actuator mechanism 290 at a proximal end 554 of the container rack latch system 580 that can optionally have a lever arm 292 or other engagement mechanism that can interact with the force transfer structure 544 on the gate 584. The latch actuator mechanism 290 can operate to move the gate 584 between the extended position (above container support surface 570 or above container supporting surfaces 574) and the retracted position (not shown, but below surface 570 or below container supporting surfaces 574). The gate 584 in the extended position can restrict translation of container 460 along the container support surfaces 570 or 574. The gate 584 in the retracted position can permit translation of container 460 along the container support surface 570 or 574.

Figure 6:
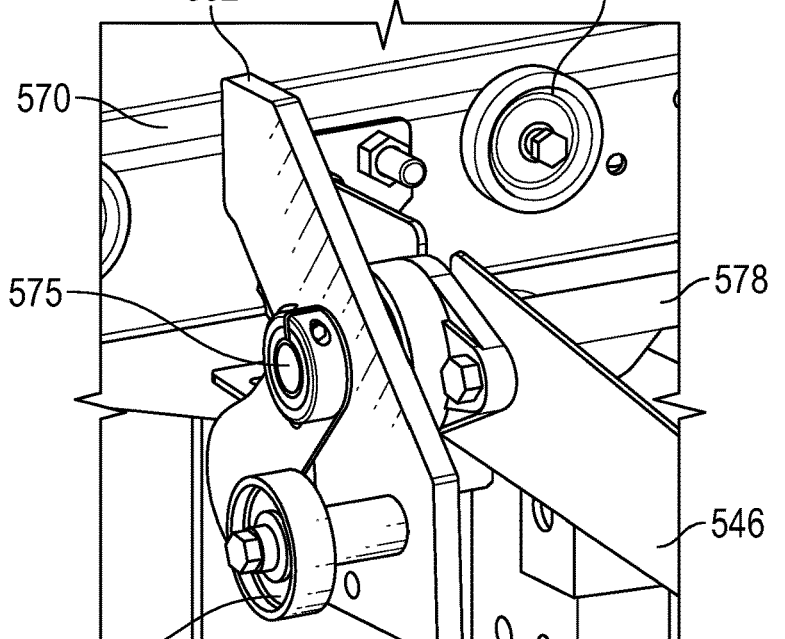
FIG. 6 illustrates aspects of a gate of a rack latch system.

FIG. 6 illustrates aspects of a proximal gate 582 in an extended position showing portions of the gate 582 above the container supporting surface 570 or container supporting surfaces 574. FIG. 6 further shows a portion of the first end support 546 with an opening for shaft 578. The shaft 578 having an axis of rotation 575 is connected or fixtured to the gate 582. A force transfer structure 544 is shown fixtured to the weighted portion of the gate 582.

FIG. 7 illustrates a perspective view of an embodiment of a container transfer carriage 220. The container transfer carriage 220 has a first or proximal end 224 and a second or distal end 226. A container 460 can be supported by carriage rollers 232 that form the carriage support surface 230. The carriage support surface 230 can include one or more actuatable stops 234, 236 that protrude above the carriage support surface 230 and can restrain and permit translation of containers onto and beyond the carriage support surface. One or more manipulator(s) 240 can engage container 460 surfaces and translate the container between ends of the carriage. The manipulator 240 can further include a gripper actuator 242 and a gripper 248. The gripper actuator 242 can move the gripper 248 towards and away from the container 460 and the gripper 248 can engage container surfaces 462 of the container 460. The container transfer carriage 220 can include a latch actuator mechanism 290 adapted to retract gates mounted to an external rack 450. The latch actuator mechanism 290 and the manipulator 240 are adapted to permit positioning of the container 460 between gates of the rack 450. The latch actuator mechanism 290 can reversibly extend and retract from the container transfer carriage 220.

Figure 8:
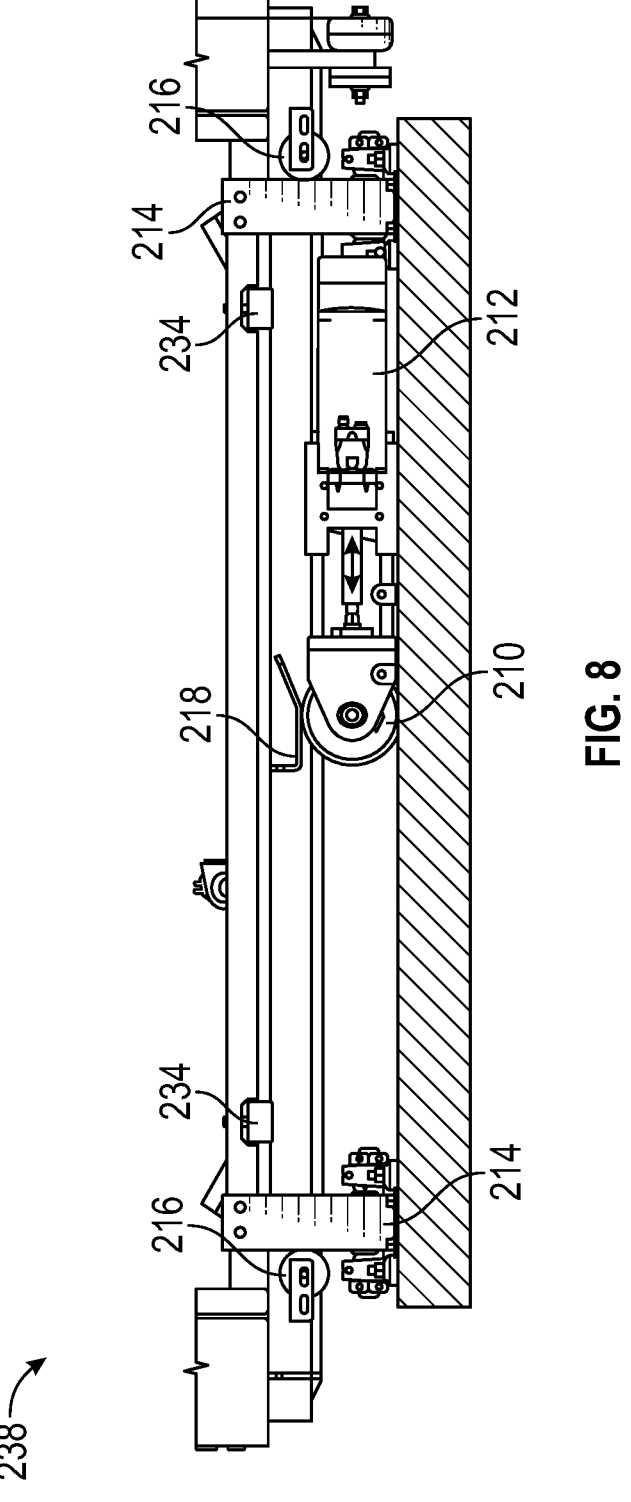
FIG. 8 illustrates an end view of a container transfer carriage.

FIG. 8 illustrates an end view (e.g. view from 224 in FIG. 7) of an embodiment of a container transfer carriage 220 that shows an example of the reversible lift assembly 238 of the container transfer carriage 220. The reversible lift assembly 238 can raise and lower an end of the carriage that is separated from a pivot point 258. The reversible lift assembly 238 can include a pivot roller drive 212 connected to a roller 210 and a roller ramp 218. The roller drive 212 can move the roller 210 against the roller ramp 218 to raise and lower the end 224 of the carriage 220. The reversible lift assembly 238 can include one or more guide(s) 214 members and one or more guide roller(s) 216. The guide 214 and guide roller 216 can reduce or eliminate side to side movement of the carriage end as the roller 210 moves against the roller ramp 218. FIG. 8 also shows an example of one or more stops 234 that are positioned above the carriage support surface 230.

FIG. 9 illustrates a top down view of the manipulator 240 in FIG. 7 that can include a gripper 248 that can engage a feature 462 of container 460. The manipulator 240 can further include a gripper actuator 242 that can move the gripper 248 towards and away from the container. The manipulator can have one or more optional sensors including a container position sensor 254 and/or a gripper actuator sensor 246.

Figure 10:
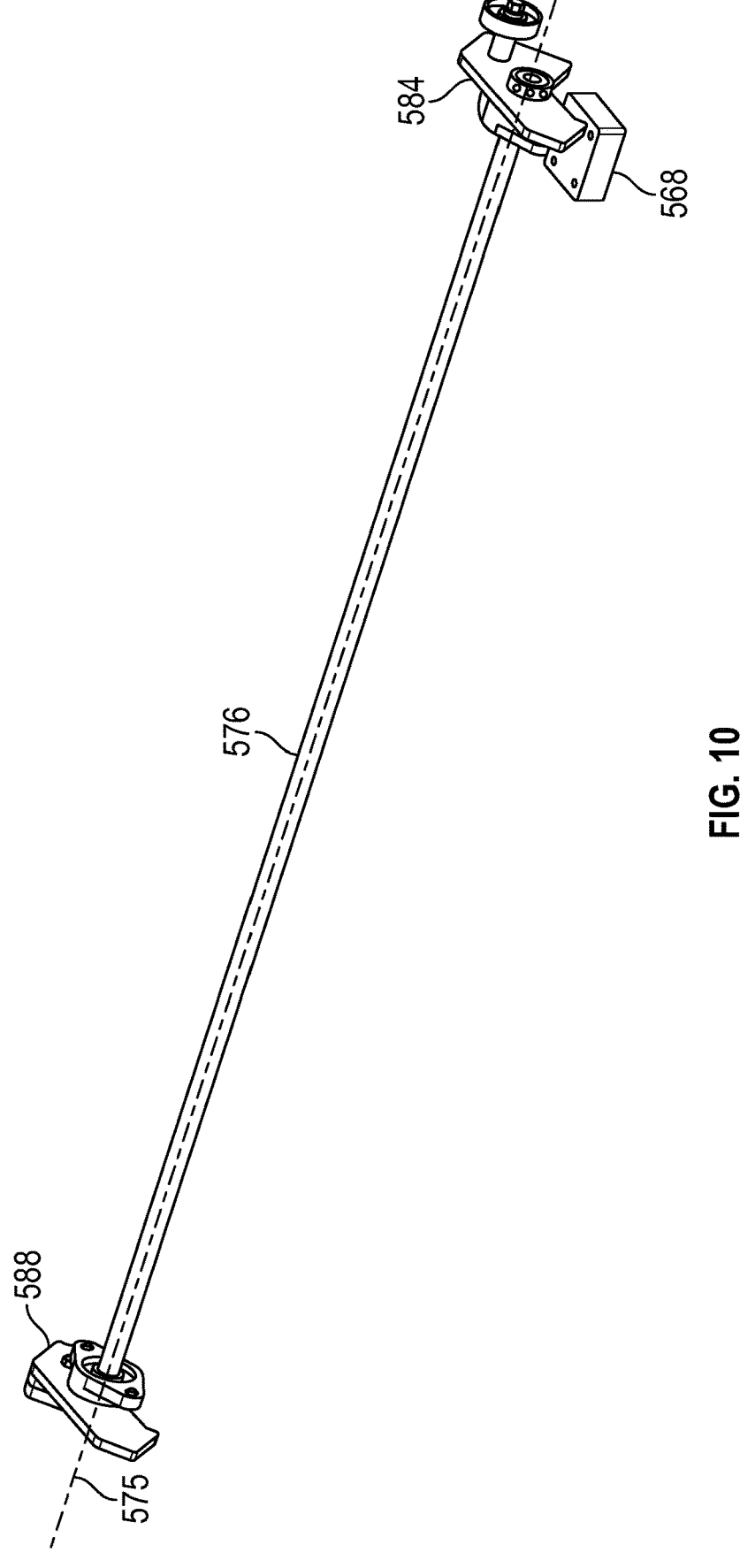
FIG. 10 illustrates aspects of retracted separated gates.

FIG. 10 illustrates aspects of retracted separated gates 584, 588 linked by a rotatable shaft 576 having a rotational axis 575 in embodiments of the disclosure. Optionally a stop 568, which can be a plate or a feature of the first end support 546, can be positioned in the container rack latch system 580 to limit rotation of the gates 584, 588 when retracted. In FIG. 10 a portion of gate 584 is shown contacting stop 568.

Figure 11:
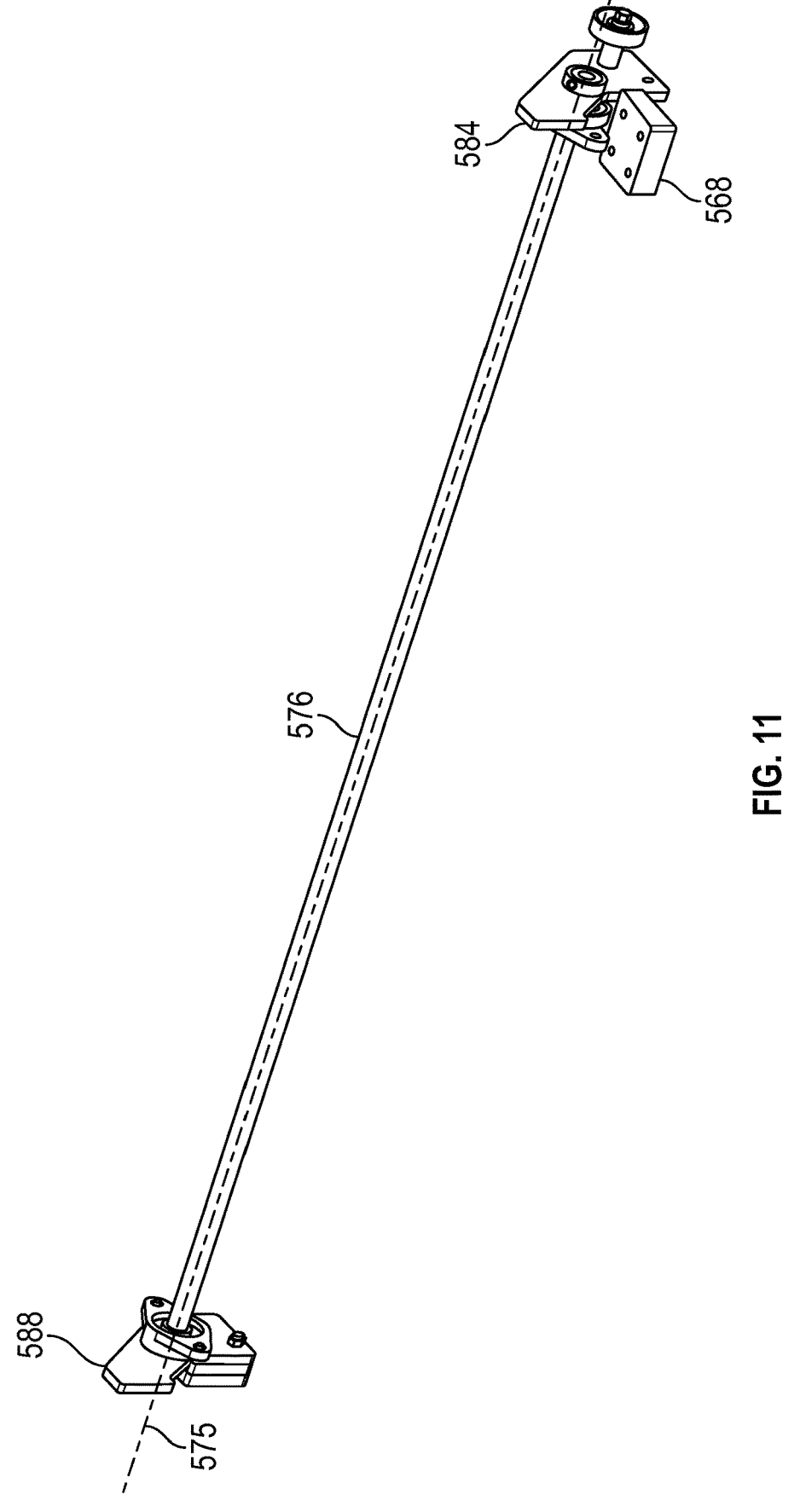
FIG. 11 illustrates aspects of extended separated gates.

FIG. 11 illustrates aspects of extended separated gates 584, 588 linked by a rotatable shaft 576 having a rotational axis 575 in embodiments of the disclosure. Gate 584 in the extended position does not contact stop 568.

FIG. 12 illustrates a side view of the container transfer carriage with pivot point 252 and a reversible lift assembly 238 in a spaced relationship and positioned on a horizontal surface 470. The transfer carriage supporting surface 230 supports the container 460 and is shown in a substantially parallel orientation 264 with respect to the horizontal surface 470; the reversible lift assembly 238 being in a first position. The rack or tower 450 is further illustrated with a container 464. The container 464 can have fluid fitting 440 and fluid fitting 452; the fluid 440, 452 of container 464 can mate with fluid fittings of other containers, for example fitting 442 of container 460, as containers are positioned in the rack. The container supporting surface 570 can be sloped 260 such that a distance (d2) from the supporting surface 570 to a horizontal surface 470 near a distal end of the rack 450 is greater than a distance (d1) from the supporting surface 570 to the horizontal surface 470 near the proximal end of the rack 450 and the carriage 220. The container supporting 570 surface can be fixtured to the rack or tower 450. The one or more gates (not shown) can be mounted to and supported by the rack or tower 450. The latch actuator mechanism 290 which can be adapted to reversibly engage with and disengage from one or more pairs of spaced gates of a container rack latch system 580 is shown in a retracted positioned below the container transfer carriage 220 and behind the front edge or face 226 of the carriage 220. In FIG. 12 the latch actuator mechanism 290 is shown disengaged or retracted below the carriage 220 or footprint of the carriage 220.

FIG. 13 illustrates a side view of the container transfer carriage 220 with a pivot point 252 and a reversible lift assembly 238 in a spaced relationship and positioned on a horizontal surface 470. The transfer carriage supporting surface (surface 230, not shown) is in a non-parallel orientation 260 with respect to the horizontal surface 470. The non-parallel orientation or angled orientation 260 of the carriage supporting surface can be substantially parallel to a support surface 570 supporting container 464 on the rack; the reversible lift assembly 238 is in a second position in this non-parallel orientation 260. The rack is illustrated as sloping downward from a distal end 556 or region of the rack that is separated from a front or proximal end 554 or region of the rack. The latch actuator mechanism 290 which can reversibly engage with and disengage from one or more pairs of spaced gates (not shown) of a container rack latch system 580 to extend and retract the gates is shown positioned below the container transfer carriage 220. The latch actuator mechanism 290 is shown extended from below the carriage or carriage footprint and is engaged with the latch actuator mechanism gates.

Figure 14:
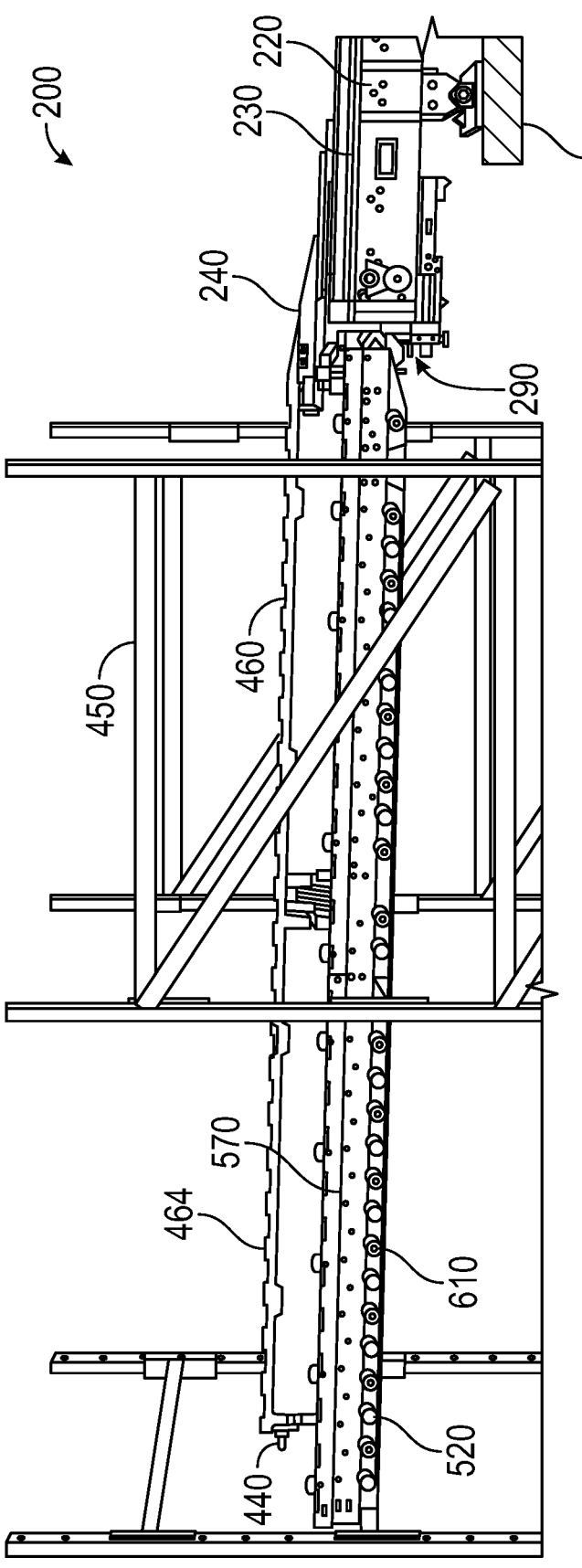
FIG. 14 illustrates a side view of a container transfer system.

FIG. 14 illustrates a side view of the container transfer carriage 220 after one or more gates on the tower (not shown, but see FIG. 4) have been retracted by the latch actuation mechanism 290 and container 460 has been translated (see also FIG. 14) by the manipulator(s) 240 into the rack 450. Container 460 is fluidly mated to container 464 in the rack. Container 464 which was initially between the one or more gates on the tower is indexed further into the tower by the translation of container 460 into the rack along container support(s) 570. The translation of container 460 into the rack transfers container 464 away from the proximal end 554 of the rack (near the carriage 220) and towards the distal end 556 of the rack. The rack is illustrated as sloping downward from the end or region 556 of the rack that is separated from a front or proximal end 554 or region of the rack.

FIG. 14 illustrates a side view of rack or tower 450 and transfer carriage 220 of FIG. 12. Two containers 460, 464 are shown positioned within the rack or tower 450 on container support surface 570. Container 460 is near the proximal or front end 554 of the rack 450 and rack latch system and container 464 is positioned outside of the container rack latch system and towards a rear or distal end 556 of the rack 450. In FIG. 14 the latch actuator mechanism 290 positioned below the carriage 220 is shown in the extended position past from the front edge or face 226 of the carriage 220. In this position the latch actuator mechanism 290 can engage the gates (e.g. gates 582 and 584 (not shown)) causing them to be retracted and thereby allowing container 460 to be loaded onto the support surface 570 by a force applied by the one or more manipulator(s) 240 of the transfer carriage 220. The force applied by the manipulator(s) 240 can also translate container 464 further into the rack 450. The latch actuator mechanism 290 can be withdrawn from contact with the one or more gates by retracting the latch actuator mechanism 290 back to the position at or behind the plane including the front face (e.g. face 226) of the carriage 220 as shown in FIG. 12. Once the latch actuator mechanism is withdrawn the retracted gates (e.g. gates 582 and 584 (not shown)) can rotate back into an extended position and thereby prevent movement of the container 460.

One or more of the various manipulator 240, gate, and latch actuator mechanism 290 steps or acts depicted in FIGS. 15-26 can be combined in any order to: load containers into the rack and support surface 570, transfer or translate containers within the rack and along the support surface 570, and, remove or unload containers and unmate the containers from each other and from the rack and support surface 570. The following sequences depicted in FIGS. 15-26 for the container transfer system 200 are non-limiting examples of some of these acts, steps, or combinations. For example, container 460 can be loaded from a carriage into the rack 450 and onto the supporting surface 570 as depicted sequentially including but not limited to aspects described and shown in FIG. 22, FIG. 23, FIG. 24, FIG. 15, and FIG. 16. In another example, container 460 can be unloaded or removed from the rack 450 and container supporting surface 570 as depicted sequentially including but not limited to aspects described and shown in FIG. 19, FIG. 20, FIG. 21, FIG. 23, FIG. 24, FIG. 25, and FIG. 26.

FIG. 15 is a schematic illustration of a top-down view of a rack 450 having supporting surfaces 570 in embodiments of the disclosure showing containers 460, 464 translated by the one or more manipulators 240 by an applied force directed into the rack (→). The container can move from the proximal end 554 of the rack toward an end 556 of the rack separated from the proximal end along a container support surfaces 570 on opposite sides of the rack. The manipulator applies a force to the containers to translate them within the rack. The gates 582, 584, 586, 588 can be acted on directly or indirectly by the latch actuator mechanism 290 (not shown) of the transfer carriage 220 (not shown). The gates in FIG. 10 are illustrated in an open or retracted position (solid fill) with the containers illustrated passing over the retracted gates. Both containers 460, 464 are shown passing over retracted gates. FIG. 10 further illustrates spacing members 546, 548 that can separate and support the gates of the rack latch system 580.

Figure 16:
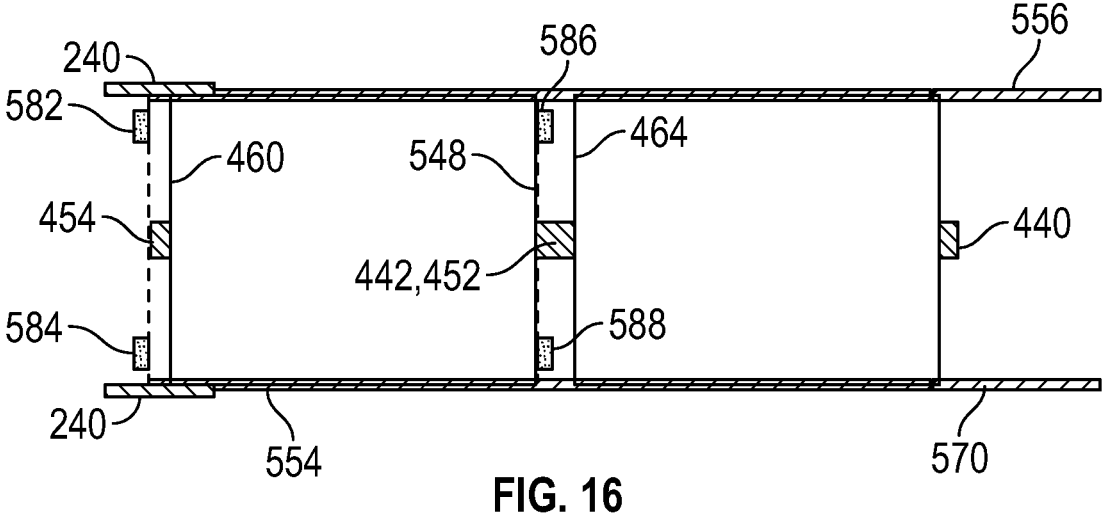
FIG. 16 is a schematic illustration of a top down view of a rack and a container transfer system.

FIG. 16 is a schematic illustration of a top down view of a rack 450 having supporting surface 570 showing containers 460, 464 held by the one or more manipulators 240 along the supporting surface 570. Container 460 is shown positioned between the extended gates 586, 588 and spaced from the extended proximal gates 582, 584. A distal surface of container 460 is shown in contact with the extended gates 586, 588. The gates can be configured in the extended position by removing the latch actuator mechanism 290 from engagement with the gates. The gates in the extended position (small grid fill) restrict or block further translation of the container 460 along the supporting surface 570.

FIG. 17 is a schematic illustration of a top down view of a rack 450 having supporting surface 570 in embodiments of the disclosure showing container 460 positioned by the one or more manipulators 240 between the gates 582, 584 and the gates 586, 588, and where neither end of the container 460 is in contact with the gates in an extended position (small grid fill). The container in FIG. 16 can be positioned as shown in FIG. 17 by applying a pulling force (←) to the container in FIG. 16 and moving the container 460 toward (as indicted by the arrow) the front/proximal end of the rack with the manipulator 240. Container 464 can also be pulled forward from its position in FIG. 16 by application of the pulling force to the container 460.

FIG. 18 is a schematic illustration of a top down view of a rack 450 having supporting surface 570 showing retraction of the gates from their extended position depicted in FIG. 17. The gates 582, 584, and gates 586, 588 can be retracted by engaging the latch actuator mechanism 290 (not shown) with the gates.

FIG. 19 is a schematic illustration of a top down view of a rack 450 having supporting surface 570 showing the container 460 positioned between the gates 582, 584, and 586, 588 in an extended position with a front or proximal surface of container 460 touching one or both of gates 582, 584. The one or more the manipulator(s) 240 are shown disengaged from the container 460. With the manipulator disengaged from the container 460, the slope of the supporting surface can allow the containers in the rack to move toward the proximal end 554 of the rack. As illustrated, container 460 can be fluidly mated or coupled with container 464 through fluid fittings 442 and 452, and container 464 can be fluidly mated with another container 466 through fluid fittings 440, 456, and so on.

FIG. 20 is a schematic illustration of a top-down view of a rack 450 having supporting surface 570 with the container 460 pushed away from contact with extended gates 582, 584 by applying a force (→) from one or more manipulator(s) 240 engaged with container 460 surfaces. After application of the force by the manipulator 240 engaged with the container, the container 460 can be positioned between extended gates 582, 584, and gates 586, 588 and can be free of contact with any of the gates. Container 464 is free of contact with any of the gates (e.g. gates 586 and 588). Fluid fitting 442 of container 460 and fluid fitting 452 of container 464 are shown coupled together.

FIG. 21 is a schematic illustration of a top-down view of a rack 450 having supporting surface 570 showing the container 460 engaged by manipulator(s) 240 being translated away from the proximal end 554 of the rack and along the supporting surface 570 and past retracted gates 582 and 584. The container 460 is translated toward the proximal end of the rack on the supporting surface 570 by a force (←) applied by the manipulator(s). This translation can take place, for example, after positioning container 460 between the pairs of gates (e.g. gate pairs 582, 586 and 584, 588) followed by retraction of the gates from their extended position with the container positioned as illustrated in FIG. 18. The one or more manipulators can translate the containers away from the rack and onto transfer carriage 220 (not shown).

Figure 22:
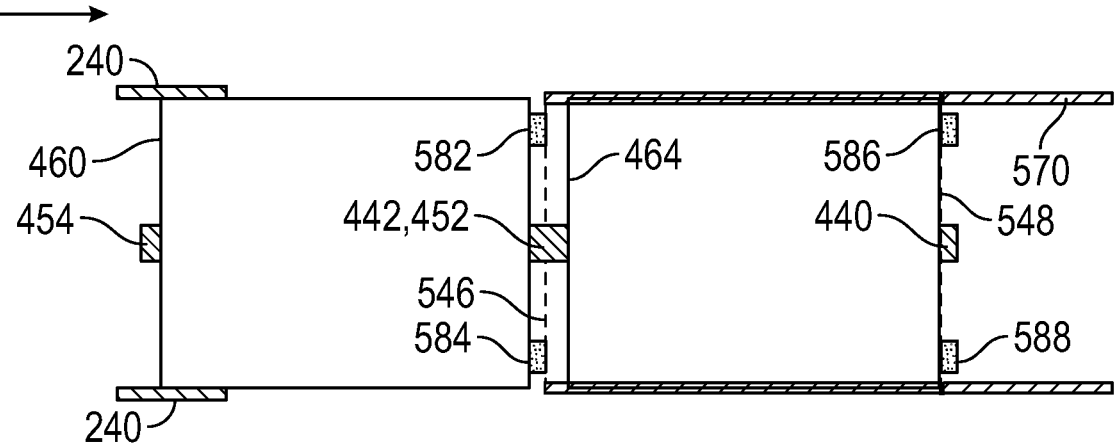
FIG. 22 is a schematic illustration of a top-down view of a rack and a container transfer system.

FIG. 22 is a schematic illustration of a top-down view of a rack 450 having supporting surface 570 showing the container 460 engaged by manipulator(s) 240 being loaded into the rack from a transfer carriage 220 (not shown). The one or more manipulator(s) apply a force in a direction towards the tower (→) to the container 460. The gates 586, 588 are in an extended position and can act as a back stop to facilitate engagement of the fluid fitting 442 on container 460 with fluid fitting 452 on container 464 to form mated inlet and outlet fittings between the containers. Container 464 contacts the gates 586, 588 in the extended position to facilitate this mating or coupling. The gates 586, 588 in the extended position allow the manipulator to push the container 460 with fluid fitting 442 into container 464 with fluid fitting 452 to fluidly mate the two containers 460 and 464 together.

Figures 23, 24:
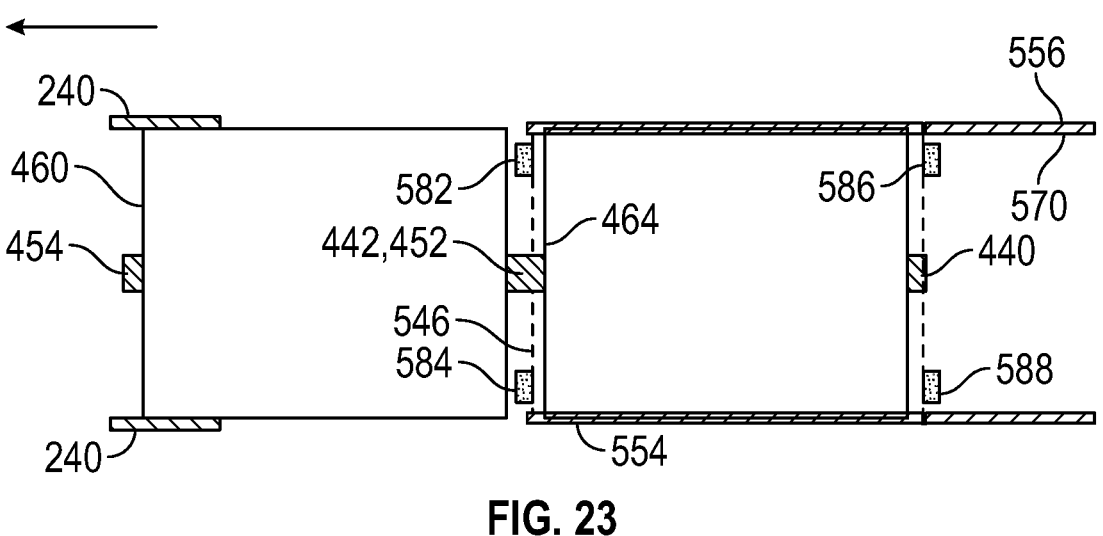
FIG. 23 is a schematic illustration of a top-down view of a rack and a container transfer system.
FIG. 24 is a schematic illustration of a top down view of a rack and a container transfer system.

FIG. 23 is a schematic illustration of a top-down view of a rack 450 having supporting surface 570 showing mated containers 460 and 464 engaged by manipulator(s) 240. The one or more manipulator(s) apply a force (←) to the mated containers that translates them away from contact with extended gates 586, 588 into a position where container 464 is between the gates and free of contact with the gates.

FIG. 24 is a schematic illustration of a top down view of a rack 450 having supporting surface 570 showing the container 460 engaged by manipulator(s) 240. Container 464 is shown positioned between the pairs of gates 582, 586, and 584, 588. The gates have been retracted by engagement of a latch actuator with the gates. Container 460 and container 464 are fluidly mated. Manipulator(s) 240 can apply a force to the mated containers 460, 464 to translate container 460 into the rack as depicted in FIG. 15.

FIG. 25 is a schematic illustration of a top down view of a rack 450 having supporting surface 570 showing the container 460 engaged by manipulator(s) 240 being translated away from the rack by the applied force (←). Container 464 is translated to be in contact with gates 582 and 584; container 464 retrained between the extended gates. Container 460 is fluidly mated with container 464 and the two containers are translated by force applied by the manipulator(s) until container 464 contacts the front or proximal gates 582, 584 which are extended.

FIG. 26 is a schematic illustration of a top down view of a rack 450 having supporting surface 570 showing the container 460 engaged by manipulator(s) 240 being removed and uncoupled from container 464 on the rack. Container 460 is translated onto the transfer carriage 220 support surface 230. Container 460 and container 464 are separated from each other by gates 582, 584 which are in the extended position. Container 460 is unmated from container 464 by the force (see arrow) applied by the manipulator(s)

to container 460 and by restriction of further translation of container 464 along the support surface by the extended gates 582, 584.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

In embodiments of the disclosure, one or more of the gates of the container rack latch system can have an uneven distribution of mass about the rotational axis (e.g. axis 575) of the shaft 576. The uneven distribution of mass can result in rotation of the gates from a retracted position to an extended position in the absence of an external force applied to the gates to maintain them in the retracted position. In embodiments of the container rack latch system 580 of the disclosure the first gate 584 and the third gate 582 can have a distribution of mass about the rotational axes 575 of the shafts 576, 578 through the gates that can cause these gates to rotate from a retracted position with respect to the first end support 546 to an extended position in the absence of an external force applied to the first and third gates.

The gates 584, 588, or gates 582, 586 in embodiments of the disclosure as illustrated in FIGS. 10 to 21 can be linked together in pairs (e.g. gate pairs 584, 588, and 582, 586, etc.) whereby the gates of a pair can move and thereby extend or retract together. In some embodiments of the disclosure the gates in a pair can be linked physically, mechanically, or electronically and thereby move between the extend or retracted position together. In some other embodiments of the disclosure the gates in a pair can be linked physically by a rotatable latch shaft 576, 578.

Aeroponic farming methods of plant production generally involves spraying a liquid nutrient solution on the roots of developing plants protruding through a growth media. In hydroponic farming for plant production, developing plants can be positioned in rafts with openings; the roots of developing plants can pass through the raft openings and can be suspended into a solution of nutrient-rich, oxygenated water. In both aeroponic and hydroponic methods, the plants are supplied with light from a suitable source above the plants to promote photosynthesis and plant development.

In embodiments of the disclosure the term fluid can refer to either a gas or a liquid. Liquids can include aqueous based solutions, organic solvents, and the like. In some embodiments the liquid can be a nutrient solution, water, or sanitizing solution for removing biofilms from hydroponic and aeroponic growing systems. In other embodiments the fluid can be a gas. The gas can be used for flushing, cleaning, or drying conduits and equipment surfaces.

The container transfer carriage in embodiments of the disclosure are particularly advantageous for, but not limited to, growing containers used in aeroponic and hydroponic farming. These growing containers can experience gravitational forces, in addition to frictional and mechanical forces, during loading and unloading of the containers onto and away from the container transfer carriage to a tower or another carriage. The container transfer carriage in embodiments of the disclosure facilitates safe and sequential movement of containers to and from the transfer carriage, between carriage stops and between tower gates, and can provide positive control over the position of the containers.

The following clauses define particular aspects and embodiments of the disclosure.

Clause 1. A container transfer carriage 220 that includes a supporting surface 230 capable of receiving and transferring a container 460 along the supporting surface 230 of the carriage 220; actuatable stops 234 near the proximal end 224 and actuatable stops 236 near the distal end 226 of the transfer carriage and supporting surface 230, the stops 234, 236 protrude above the supporting surface 230 or from sides of the carriage, the stops 234 permit transfer of the container onto the carriage supporting surface between the stops without stop actuation, and the stops 236 permit transfer of the container positioned between the stops beyond the supporting surface with stop actuation; the container transfer carriage further includes one or more manipulators 240 that engage the container 460, the manipulator 240 translatable along a length of the carriage, the manipulator 240 adapted to translate the container along the supporting surface 230; and, a latch actuator mechanism 290 adapted to retract gates 584, 588 mounted or configured with an external rack 450 to permit positioning of the container 460 between the gates 584, 588.

Clause 2. The container transfer carriage of clause 1 wherein the latch actuator mechanism 290 reversibly extends and retracts from the carriage.

Clause 3. The container transfer carriage as in any one of clauses 1 and 2, wherein the container transfer carriage 220 further comprises a pivot mechanism, the pivot mechanism comprising a pivot point 252 fixtured below the carriage surface and a reversible lift assembly 238 spaced from the pivot point that raises and lowers an end of the transfer carriage, the pivot mechanism adapted to position the supporting surface 230 of the carriage between a first position that is substantially parallel 264 to a horizontal surface 470 and a second position 260 that is substantially parallel to a container supporting surface 570.

Clause 4. The container transfer carriage of clause 3, wherein the reversible lift assembly 238 comprises a pivot roller drive 212 connected to a roller 210, a roller ramp 218, the roller drive moves the roller 210 against a roller ramp 218 to raise and lower an end of the carriage.

Clause 5. The container transfer carriage as in any one of clauses 3 and 4, wherein the reversible lift assembly 238 further comprises a guide 214 and a guide roller 216.

Clause 6. The container transfer carriage as in any one of clauses 1 to 5, wherein the latch actuator mechanism 290 further comprises a lever arm 292 adapted to engage the gates 584, 588 mounted with the external rack 450 to retract the gates.

7. The container transfer carriage of as in any one of clauses 1 to 6, wherein the manipulators 240 further comprise gripper actuators 242 that reversibly engage/disengage one or more grippers 248 with the container 460.

Clause 8. The container transfer carriage 220 as in any one of clauses 1 to 7, wherein the latch actuator mechanism 290 is adapted to cooperate with one or more manipulators 240 of the carriage 220 to move the container between the carriage support surface 230 and the container support surface 570 or container support surfaces 574 of the rack.

Clause 9. The container transfer carriage 220 as in any one of clauses 1 to 9, wherein the one or more manipulators 240 are configured to translate along a length of the carriage whereby the container is moved along the supporting surface 230 towards and away from a first end region 224 of the carriage and towards and away from a second end region 226 of the carriage.

Clause 10. A method of container transfer carriage 220 operation, comprising: engaging a container 460 with a manipulator 240 of the container transfer carriage 220;

transferring the container 460 toward or away from a distal end 226 of a supporting surface 230 of the container transfer carriage 220; operating a latch actuator mechanism 290 of the container transfer carriage 220 to retract a gate on a rack 450; and, operating the one or more manipulators 240 of the container transfer carriage 220 to transfer the container 460 toward or away from the distal end 226 of the carriage container supporting surface 230 of the container transfer carriage 220.

Clause 11. The method of container transfer carriage 220 operation of clause 10, comprising orienting the supporting surface 230 of the container transfer carriage parallel to a container supporting surface 570 of support 510 that is mounted to the rack 450.

Clause 12. The method of container transfer carriage 220 operation as in any one of clauses 10 and 11, comprising: operating the one or more manipulators 240 to move the container 460 along the carriage supporting surface 230 towards and away from the rack 450; and, actuating a stop 234, 236 that protrudes above the supporting surface 230 in a direction of travel of the container 460 beyond the carriage container supporting surface 230, the stop actuation releasing the stop and permitting travel of the container 460 beyond the carriage container supporting surface 230.

Clause 13. The method of container transfer carriage 220 operation as in any one of clauses 10 to 12, further comprising: actuating the stop 236 near the distal end 226 of the supporting surface, the stop protrudes above the carriage container supporting surface 230, wherein actuating the stop releases the stop from being fixed and permits transfer of the container 460 away from the distal end 226 of the supporting surface 230 of the container transfer carriage 220 towards the container support surface 570 of the rack.

Clause 14. The method of container transfer carriage 220 operation as in any one of clauses 10 to 13 wherein the stop 234, 236 is fixed and the container is positioned against the stop 234, 236.

Clause 15. A container transfer carriage 220 comprising: a carriage transfer surface 230 that permits translation of a container 460 from a first end region 224 of the carriage toward a second end region 226 of the carriage, the container transfer carriage 220 comprises a first reversible stop 234 near the first end region of the carriage, the first stop has a portion above the carriage transfer surface 230, a second reversible stop 236 near the second end region of the carriage, the second stop has a portion above the carriage transfer surface 230; a latch actuator mechanism 290 adapted to retract one or more gates 584, 588 adapted to restrain container 460 in an external rack 450; the transfer carriage comprises a manipulator 240 that engages a surface of the container 460, the manipulator 240 reversibly translatable from the first position near the first end region 224 the carriage past the second end region 226 of the carriage while engaging the container 460; and, wherein the manipulator 240, the latch actuator mechanism 290, and the second stop 236 operate to transfer the container 460 between the carriage transfer surface 230 and the rack 450.

Clause 16. The container transfer carriage 220 of clause 15 wherein the latch actuator mechanism 290 is positioned beneath the carriage transfer surface 230, the latch actuator further comprising a lever arm 292 that is configured to reversibly engage and disengage from the one or more gates.

Clause 17. A container transfer carriage 220 comprising: a carriage transfer surface 230 adapted to reversibly translate a container 460 between a first end region 224 of the carriage and a second end region 226 of the carriage, the transfer carriage comprises a first reversible stop 234 near the first end region of the carriage, the first stop has a portion above the carriage transfer surface 230, a second reversible stop 236 near the second end region of the carriage, the second stop has a portion above the carriage transfer surface 230; a carriage pivot mechanism adapted to reversibly raise and lower an end of the container carriage 220 between a horizontal position 264 where the first end of the carriage and the second end of the carriage are at the same height from a horizontal surface 470 and an angled position 260 where the first end of the carriage and the second end of the carriage are at different heights from the horizontal surface 470, the carriage pivot mechanism comprises a carriage pivoting structure 252 and a carriage height adjustment apparatus 238; the container transfer carriage further comprising a latch actuator mechanism 290, the latch actuator mechanism adapted to retract and extend separated gates 584, 588 that control movement of the container 460 between the gates on a rack 450 whereby the container 460 is transferred between the carriage transfer surface 230 and the rack 450; and, the container transfer carriage comprises a manipulator 240 that engages the container, the manipulator adapted to translate the container beyond the first end region 224 of the carriage and beyond the second (tower) end region 226 of the carriage.

Clause 18. The container transfer carriage 220 of clause 17 further comprising a carriage controller comprising a carriage controller processor and a non-transitory computer readable medium storing a set of control instructions executable by the processor to control operation of the carriage to perform carriage controller steps or acts comprising: retracting the one or more pairs of gates 582, 586 and/or 584, 588 and translating the manipulator 240 engaged with the container 460 to position the container on the rack 450 between the retracted gates 584, 588.

Clause 19. The container transfer carriage of clause 18, wherein the carriage controller steps further comprise: operating the latch actuator mechanism 290 to retract the gates 584, 588.

Clause 20. The container transfer carriage as in any one of clauses 18 and 19, wherein the carriage controller steps further comprise: translating the manipulator 240 engaged with the container 460 to position wherein the container 460 is in a non-touching relationship position between the gates 584, 588 of the rack 450, and retracting the gates.

Clause 21. The container transfer carriage as in any one of clauses 18 to 20, wherein the carriage controller steps further comprise: operating the latch actuator mechanism 290 to retract and extend the gates 584, 588.

Clause 22. The container transfer carriage as in any one of clauses 18 to 21, wherein the carriage controller steps further comprise: releasing the second stop 236; and, translating the manipulator 240 engaged with the container 460 and transferring the container past the second stop 236.

Clause 23. The container transfer carriage as in any one of clauses 18 to 22, wherein the carriage controller steps further comprise: releasing the first stop 234; and, translating the manipulator 240 engaged with the container 460 and transferring the container past the first stop 234.

Clause 24. The container transfer carriage as in any one of clauses 18 to 23, where in the carriage controller steps further comprise: engaging the carriage pivot mechanism to raise and lower an end of the container carriage 220 between the horizontal position 264 where the first end of the carriage and the second end of the carriage are at the same height from the horizontal surface 470 and an angled position 260 where the first end of the carriage and the second end of the carriage are at different heights from the horizontal surface 470.

Clause 25. A method of container transfer carriage 220 operation, including: transferring a container 460 engaged by one or more carriage manipulators 240, the container positioned in between and in touching contact with one or more gates, toward or away from a proximal end of a rack 450 to position the container 460 with the one or more manipulators in a non-contacting relationship between the one or more gates; and, operating a latch actuator mechanism 290 of the container transfer carriage 220 to retract the one or more gates 582, 586, 584, 588 on the rack.

Clause 26. The method of container transfer carriage operation of clause 25 further including; operating the one or more manipulators 240 of the container transfer carriage 220 to transfer the container 460 toward or away from the distal end 226 of the supporting surface 230 of the container transfer carriage 220.

Clause 27. The container transfer carriage of clause 26, further comprising a carriage controller, the carriage controller comprising a carriage controller processor and a non-transitory computer readable medium storing a set of control instructions executable by the processor to control operation of the carriage to perform carriage controller steps or acts comprising: transferring a container 460 engaged by one or more carriage manipulators 240, the container positioned in between and in touching contact with one or more gates, toward or away from a proximal end of a rack 450 to position the container 460 with the one or more manipulators in a non-contacting relationship between the one or more gates; and, operating a latch actuator mechanism 290 of the container transfer carriage 220 to retract the one or more gates (582, 586, 584, 588) on the rack.

Clause 28. The container transfer carriage of clause 27, wherein the carriage controller steps further include: operating the one or more manipulators 240 of the container transfer carriage 220 to transfer the container 460 toward or away from the distal end 226 of the supporting surface 230 of the container transfer carriage 220.

Clause 29. A method of container transfer carriage 220 operation, including: unmating a first container 460 fluidly mated with a second container 464, the first container engaged by one or more carriage manipulators 240 of a transfer carriage 220 and the first container 460 and the second container 464 separated by one or more gates 582, 584 in an extended position on a rack 450 supporting the second container 464, the act or step of unmating including applying a force by the one or more carriage manipulator(s) to the first container 460 in a direction away from the second container 464.

Clause 30. The container transfer carriage of clause 29, further comprising a carriage controller, the carriage controller comprising a carriage controller processor and a non-transitory computer readable medium storing a set of control instructions executable by the processor to control operation of the carriage to perform carriage controller steps or acts comprising: unmating a first container 460 fluidly mated with a second container 464, the first container engaged by one or more carriage manipulators 240 of a transfer carriage and the first container 460 and the second container 464 separated by one or more gates 582, 584 in an extended position of a container rack latch system 580; and, instructing the carriage manipulator(s) to apply a force to the first container 460 in a direction away from the second container 464.

Clause 31. A container rack latch system 580, comprising: a first gate 584 at a proximal end 554 of the container rack latch system 580 and a second gate 588 spaced from the proximal end of the container rack latch system, the gates 584, 588 configured to operate in an extended orientation that prevents transfer of a container 464 positioned on a container supporting surface 570 away from between the gates 584, 588, and the gates 584, 588 further configured to operate in a retracted orientation wherein the gates are adapted to permit transfer of the container 464 away from the rack or further into the rack and beyond the gates 584, 588.

Clause 32. The container rack latch system 580 of clause 31 wherein the gates 584, 588 are configured to rotate between the retracted position and the extended position, the gates linked together by a rotatable latch shaft 576.

Clause 33. The container rack latch system 580, as in any one of clauses 31 and 32 further comprising a third gate and a fourth gate 582, 586 that are configured to operate between the retracted and extended positions, the third gate and fourth gates linked together by a rotatable shaft 578, the first and second gates 584, 588 separated from the third and fourth gates 582, 586 by a first end latch support 546 and a second end latch support 548 spaced from the first end latch support 546.

Clause 34. The container rack latch system 580 as in any one of clauses 31 to 33 wherein the container supporting surface 570 is sloped, the container supporting surface a distance (d2) from a horizontal surface 470 near the second end latch support 548 wherein (d2) is greater than a distance (d1) from the support surface 570 to the horizontal surface 470 near the first end latch support 546.

Clause 35. The container rack latch system 580 as in any one of clauses 31 to 34 further comprising a force transfer structure 544 on the gate 584; the force transfer structure spaced from a rotational axis 575 of the rotatable shaft 576.

Clause 36. A method of container rack latch system 580 operation comprising: applying a first force to a first container 460 on the support surface 570 of the container rack latch system 580 to translate the first container to a position between gates 584, 588 of the container rack latch system 580, the gates in an extended position, and the container 460 free from contact with the gates; and, applying a second force to a force transfer structure 544 on a proximal gate 584 of the container rack latch system 580 to move the proximal gate 584 and the linked opposing gate 588 from the extended position to a retracted position.

Clause 37. The method of container rack latch system 580 operation of clause 36 further comprising: applying a third force to the first container 460 to transfer the first container along the container support surface 570 of the container rack latch system 580 with the gates 584, 588 in the retracted position.

Clause 38. The method of container rack latch system 580 operation as in clause 37, wherein the transfer of the first container indexes a second container out from between the gates in the retracted position, the transfer positions the second container 464 in a non-overlapping position with the gates, the method further comprising: removing the second force whereby the gates move from the retracted to the extended position.

Clause 39. The method of container rack latch system 580 operation as in any one of clauses 37 and 38 that further comprises removing the third force from the one or more containers with the gates in the extended position.

Clause 40. The method of container rack latch system 580 operation as in clause 37 wherein the transfer comprises removing the container 460 from the proximal end of the container rack latch system 580.

Clause 41. The method of container rack latch system 580 operation as in any one of clauses 36 to 40 wherein a latch actuator mechanism 290 applies the second force to the force transfer structure 544 on a proximal gate 584 of the container rack latch system 580 to move the proximal gate 584 and the linked opposing gate 588 from the extended position to a retracted position, the latch actuator mechanism 290 interacts with the force transfer structure 544 on the gate 584 to reversibly move the gates 584, 588 from the extended position to the retracted position.

Clause 42. The method of container rack latch system 580 operation as in clause 40 wherein removing the container 460 from the proximal end of the container rack latch system 580 further comprises: positioning the second container 464 in a non-overlapping position with the gates 584, 588; extending the gates; and, separating the container 460 from the container 464 that is between the extended gates in the container transfer system 580.

Clause 43. The method of container rack latch system 580 operation as in clause 42 wherein extending the gates from the retracted position to the extended position comprises disengaging the latch actuator mechanism 290 from the force transfer structure 544 on the proximal gate 584 of a container rack latch system 580.

Clause 43. A method of container rack latch system 580 operation, comprising: applying a first force to move a first container 460 to fluidly mate the first container with a second container 464 on the supporting surface 570 of the container rack latch system 580, the second container between a first gate 584 in an extended position and a second gate 588 in an extended position, applying the first force until a distal end of the second container 464 contacts the gate 588; removing the first applied force and positioning the second container 464 between the first gate 584 and the second gate 588 spaced from the proximal end, the second container 464 free of contact with gates 584, 588; and, retracting the gates 584, 588 of the container rack latch system 580.

Clause 44. The method of container rack latch system 580 operation of clause 43 wherein the removing of the first applied force comprises applying a second force to the container 460 that is in the reverse direction of the first applied force (FIG. 23).

Clause 45. The method of container rack latch system 580 operation as in any one of clauses 43-44 further comprising: applying a force to a force transfer structure 544 on a proximal gate 584 of the container rack latch system 580 to move the first gate 584 and the second gate 588 from the extended position to a retracted position.

Clause 46. The method of container rack latch system 580 operation as in any one of clauses 43-45 further comprising: translating the second container 464 and first container 460 along the container support 570.

Clause 47. The method of container rack latch system 580 operation as in any one of clauses 43 to 46 wherein the container supporting surface 570 is sloped, the container supporting surface a distance (d2) from a horizontal surface 470 near the second end latch support 548 wherein (d2) is greater than a distance (d1) from the support surface 570 to the horizontal surface 470 near the first end latch support 546.

Clause 48. A container rack latch system 580 comprising: a first gate 584, a second gate 588, and a shaft 576 rotatably connecting the first gate with the second gate and separating the first gate 584 from the second gate 588, the shaft 576 passing through an opening in a first proximal end support 546 and the shaft passing through an opening in a second end support 548 spaced from the first proximal end support; and, a force transfer structure 544 connected to the first gate 584, the force transfer structure positioned separate from a rotational axis 575 of the shaft 576.

Clause 49. The container rack latch system 580 of clause 48, wherein the force transfer structure 544 comprises a rotatable element.

Clause 50. The container rack latch system 580 as in any one of clauses 48 and 49 wherein the first gate 584 and the second gate 588 are in an extended position above a top surface the first end support 546 and a top surface of the second end support 548.

Clause 51. The container rack latch system 580 as in any one of clauses 48 to 50 further comprising a third gate 582, a fourth gate 586, and a shaft 578 rotatably connecting the third gate with the fourth gate and separating the third gate 582 from the fourth gate 586, the shaft 578 passing through an opening in a first proximal end support 546 and passing through an opening in a second end support 548 spaced from the first proximal end support; and, a force transfer structure 544 connected to the first gate 582 and positioned separate from a rotational axis 575 of the shaft 578.

Clause 52. The container rack latch system 580 as in any one of clauses 48 to 51 wherein the first gate 584 and the third gate 582 have an uneven distribution of mass about the rotational axis of the shaft 576, 578 that results in rotation the gates 584, 582 from a retracted position with respect to the support surface 570 to an extended position with respect to the support surface 570 in the absence of an external force applied to the first 584 and third gates 582.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A container transfer system, comprising:
a container transfer carriage, said container transfer carriage comprises a supporting surface capable of receiving and transferring a container along the supporting surface of the transfer carriage;
actuatable stops near a proximal end and near a distal end of the supporting surface of the container transfer carriage, said stops protrude above the supporting surface, said stops permit transfer of the container onto the carriage supporting surface between the stops without stop actuation, said stops permit transfer of the container positioned between the stops beyond said supporting surface with stop actuation;
a manipulator that engages the container, said manipulator translates along a length of the container transfer carriage, said manipulator adapted to translate the container along the supporting surface;
a latch actuator mechanism that retracts and extends gates of a container rack latch system connected to a rack, said container rack latch system configured to removably receive the container between said gates on a supporting surface of the container rack latch system; and wherein the container transfer carriage and the latch actuator mechanism operate cooperatively to load the container from the container transfer carriage to the supporting surface of the container rack latch system and operate cooperatively to unload the container from the supporting surface of the container rack latch system to the carriage.

2. The container transfer system of claim 1, wherein the latch actuator mechanism reversibly moves towards and away from the carriage.

3. The container transfer system of claim 1, wherein the container transfer carriage includes a pivot mechanism adapted to position the supporting surface of said carriage between an orientation parallel to a horizontal and an orientation parallel to the supporting surface of the container rack latch system, said pivot mechanism comprising a pivot point fixtured below the carriage supporting surface and a reversible lift assembly spaced from the pivot point that raises and lowers an end of said transfer carriage.

4. The container transfer system of claim 3, wherein the reversible lift assembly comprises a pivot roller drive connected to a roller, a roller ramp, said roller drive moves the roller against a roller ramp to raise and lower an end of the carriage.

5. The container transfer system of claim 4, wherein the reversible lift assembly further comprises a guide and a guide roller.

6. The container transfer system of claim 1, wherein the latch actuator mechanism is connected to the container transfer carriage, said latch actuator mechanism adapted to engage the container rack latch system connected to the rack, said latch actuator mechanism reversibly extends and retracts; said latch actuator mechanism cooperates with one or more manipulators of the container transfer carriage to transfer a container from the container transfer carriage onto the support surface of the container rack latch system.

7. The container transfer system of claim 1, wherein the container transfer carriage comprises a gripper actuator to position a gripper against opposing sides of the container.

8. The container transfer system of claim 1, wherein the manipulator is configured to move the container along the transfer carriage supporting surface towards and away from the supporting surface of the container rack latch system.

9. The container transfer system of claim 1, wherein the container rack latch system comprises a rotatable gate at a proximal end of the rack and a rotatable gate spaced from the proximal end of the rack, the rotatable gate at the proximal end of the rack linked to the rotatable gate spaced from the proximal end of the rack.

10. The container transfer system of claim 9, wherein the rotatable gate at a proximal end of the rack linked to the rotatable gate spaced from the proximal end of the rack are capable of being positioned in an extended orientation protruding above a plane defined by the supporting surface of the container rack latch system and are capable of being positioned in a retracted orientation extending below the plane defined by the supporting surface the container rack latch system.

11. The container transfer system of claim 10, wherein in the extended orientation, the linked rotatable gates prevent transfer of the container from the container transfer carriage supporting surface to the supporting surface of the rack latch system.

12. The container transfer system of claim 10, wherein in the retracted orientation, the linked rotatable gates allows transfer of the container from the container transfer carriage supporting surface to the supporting surface of the container rack latch system.

13. A method of container transfer system operation, comprising:

transferring a container between a container transfer carriage support surface and a container rack latch system support surface, the container rack latch system positioned within a rack comprises gates capable of extended and retracted positions, the container transfer carriage comprising a manipulator and a latch actuator mechanism; said transferring comprising retracting the gates with the latch actuator mechanism; and translating the container between the container transfer carriage support surface and the container rack latch support surface with the container transfer carriage manipulator; wherein the container transfer carriage comprises an actuatable stop; and the method comprises positioning the container against the actuatable stop.

14. The method of container transfer system operation of claim 13, comprising positioning the container transfer carriage support surface in an orientation parallel to the container rack latch support surface.

15. The method of container transfer system operation of claim 13, wherein latch actuator mechanism is fixtured to the container transfer carriage below the carriage supporting surface.

16. The method of container transfer system operation of claim 13, comprising: positioning the container transfer carriage manipulator against a side of the container.

17. The method of container transfer system operation of claim 13, comprising releasing the actuatable stop in a direction of translation of the container from the container transfer carriage support surface.

18. The method of container transfer system operation of claim 13, wherein the gates comprise a proximal end gate and a gate spaced from the proximal end; said spacing between the gates larger than a dimension of the container.

19. The method of container transfer system operation of claim 18, wherein the proximal end gate and the gate spaced from the proximal end are mechanically coupled together by a rotatable shaft.

20. The method of container transfer system operation of claim 18, comprising: (i) extending the proximal end gate and the gate spaced from the proximal end above a plane defined by the container supporting surface; or, (ii) retracting the proximal end gate and the gate spaced from the proximal end below the plane defined by the supporting surface.

21. The method of container transfer system operation of claim 20, wherein the extended orientation of the gates restricts transferring of the container between the container transfer carriage and the supporting surface of the container rack latch system within the rack.

22. The method of container transfer system operation of claim 20, wherein in the retracted orientation of the gates enables transferring of the container between the container transfer carriage and the supporting surface of the container rack latch system within the rack.

23. The method of container transfer system operation of claim 20, comprising:

(i) positioning the gates in the retracted orientation;

(ii) transferring the container with the container transfer carriage manipulators into a non-overlapping position and between the gates from the supporting surface of the container transfer carriage to the supporting surface of the container rack latch system;

(iii) extending the gates; and (iv) disengaging the container transfer carriage manipulator from the container.

24. A container transfer system comprising:

a container transfer carriage comprising a carriage transfer surface adapted to translate a container from a first end region of the container transfer carriage toward a second end region of the container transfer carriage, said container transfer carriage comprises a first reversible stop near the first end region of the carriage, said first stop has a portion above the carriage transfer surface, a second reversible stop positioned near the second end region of the carriage, said second stop has a portion above the carriage transfer surface;

said container transfer carriage comprise a latch actuator mechanism adapted to extend and retract one more proximal gates and one or more gates separated from the proximal gates of a container rack latch system by a distance greater than a dimension of the container;

said container transfer carriage comprises a manipulator that engages a surface of the container, said manipulator reversibly translatable from the first position near the first end region of the container transfer carriage past the second end region of the container transfer carriage while engaging said container; and the manipulator, the latch actuator mechanism, and the second reversible stop cooperate to enable transfer of the container from the carriage transfer surface onto a supporting surface of the container rack latch system within the rack, said manipulator capable of positioning the container past the one or more proximal gates and before the one or more gates separated from the proximal gates whereby the gates can be extended.

25. The container transfer system of claim 24, wherein said container positioned past the proximal gate and before gate separated from the proximal gate is positioned between the gates and is free of contact and overlap with the gates in the extended and retracted positions.

26. The container transfer system of claim 24 wherein said container is positioned between the separated external gates and the container is in contact with at least one gate in an extended position.

27. The container transfer system of claim 24 wherein the latch actuator mechanism is positioned beneath the carriage transfer surface and comprises a lever arm that interacts with at least one force transfer structure on the one or more proximal gates to reversibly move/leverage the gate between extended and retracted positions.

28. The container transfer system of claim 24 wherein the container rack latch system positioned within the rack comprises a first gate pair consisting of the proximal gate and the gate separated from the proximal gate and a second gate pair consisting of the proximal gate and the gate separated from the proximal gate, wherein the first gate pair and second gate pair comprise rotatable gates that are linked by a rotatable shaft.

29. A container transfer system comprising:

a container transfer carriage comprising a carriage transfer surface that translates a container from a first end region of the carriage toward a second end region of the carriage, said transfer carriage comprises a first reversible stop near the first end region of the carriage, said first stop has a portion above the carriage transfer surface, said transfer carriage comprises a second reversible stop near the second end region of the container transfer carriage, said second stop has a portion above the carriage transfer surface;

said container transfer carriage further comprising a carriage pivot mechanism that raises and that lowers an end of the container transfer carriage and the carriage transfer surface from a horizontal position where the first end region of the carriage and the second end region of the carriage are at a same height to an angled position where the first end region of the carriage and the second end region of the carriage are at different heights, said carriage pivot mechanism comprises a carriage pivoting structure and a carriage height adjustment apparatus;

a latch actuator mechanism, said latch actuator mechanism adapted to open or close one or more pairs of separated gates of a container rack latch system;

said container transfer carriage comprising a manipulator that reversibly translates from the first end region of the carriage past the second end region of the carriage, said manipulator engageable with a surface of the container; and a carriage controller comprising a carriage controller processor and a non-transitory computer readable medium storing a set of control instructions executable by the processor to control operation of the carriage to perform carriage controller steps comprising: translating the manipulator engaged with a surface of the container on the container transfer carriage support surface to position the container on the container support surface between retracted separated gates of the container rack latch system.

30. The container transfer system of claim 29, wherein the carriage controller steps further comprise: operating the latch actuator mechanism to open and close the separated gates.

31. The container transfer system of claim 29, wherein the carriage controller steps further comprise: translating the manipulator engaged with the container to position the container in non-contacting relationship between the separated gates of the container rack latch system; and operating the latch actuator mechanism to open and close the separated gates of the container rack latch system.

32. The container transfer system of claim 29, wherein the carriage controller steps further comprise: releasing the second stop; and, translating the manipulator engaged with the container and transferring the container from the first end region of the carriage transfer surface past the second stop.

33. The container transfer system of claim 29, wherein the carriage controller steps further comprise: determining a position of the container within the container rack latch system between the separated gates of the container rack latch system, and instructing the manipulator to advance or retract.

34. The container transfer system as in claim 29 wherein the separated gates are rotatable, said separated gates linked together by a rotatable shaft.

35. A method of loading and unloading containers from a container transfer system comprising:

moving a container with one or more container transfer carriage manipulators, said container on a container supporting surface of a container rack latch system, the container moved from a first position between a pair of gates in an extended position where the container is initially touching a first gate at a proximal end of the rack to a second position wherein the container is free of contact with the first gate at the proximal end of the rack and the container is free of contact with a second gate separated from the first gate with the first and second gates in an extended position;

retracting the pair of gates at or below the container supporting surface of the container rack latch system; and translating the container along the supporting surface; wherein the container transfer carriage comprises an actuatable stop; and the method comprises positioning the container against the actuatable stop.

36. The method of loading and unloading containers from the container transfer system of claim 35, wherein the container supporting surface of the container rack latch system that is positioned within the rack is sloped such that a distance (d2) from the supporting surface to a horizontal surface near a second end latch support of the rack latch system is greater than a distance (d1) from the supporting surface to the horizontal surface near the first end latch support of the rack latch system.

\* \* \* \* \*